US007298682B2

United States Patent
Miura et al.

(10) Patent No.: US 7,298,682 B2
(45) Date of Patent: Nov. 20, 2007

(54) METHOD OF RECORDING INFORMATION IN OPTICAL RECORDING MEDIUM, INFORMATION RECORDING APPARATUS AND OPTICAL RECORDING MEDIUM

(75) Inventors: Hideaki Miura, Tokyo (JP); Tatsuya Kato, Tokyo (JP); Tetsuro Mizushima, Tokyo (JP)

(73) Assignee: TDK Corporation, Tokyo (JP)

( * ) Notice: Subject to any disclaimer, the term of this patent is extended or adjusted under 35 U.S.C. 154(b) by 465 days.

(21) Appl. No.: 10/504,441

(22) PCT Filed: Feb. 14, 2003

(86) PCT No.: PCT/JP03/01546

§ 371 (c)(1),
(2), (4) Date: Aug. 12, 2004

(87) PCT Pub. No.: WO03/069604

PCT Pub. Date: Aug. 21, 2003

(65) Prior Publication Data

US 2005/0163011 A1   Jul. 28, 2005

(30) Foreign Application Priority Data

Feb. 14, 2002 (JP) .............................. 2002-037238

(51) Int. Cl.
*G11B 7/00* (2006.01)
(52) U.S. Cl. .................. 369/59.12; 369/116; 369/284; 369/275.1
(58) Field of Classification Search ............. 369/275.1, 369/94, 116, 59.12, 59.11, 59.1, 288, 286, 369/13.24, 125, 47.5, 47.51, 284; 428/64.5, 428/64.4
See application file for complete search history.

(56) References Cited

U.S. PATENT DOCUMENTS 5,768,251 A * 6/1998 Ito et al. ................. 369/275.1

(Continued)

FOREIGN PATENT DOCUMENTS

EP          0902424 B1        3/1999

(Continued)

OTHER PUBLICATIONS

Narumi, Kenji et al., "45GB Rewritable Dual-Layer Phase-Change Optical Disk with a Transmittance Balanced Structure", Technical Digest ISOM'01, International Symposium on Optical Memory 2001, Oct. 16-19, 2001, 3 pgs.

*Primary Examiner*—Ali Neyzari
(74) *Attorney, Agent, or Firm*—Seed IP Law Group PLLC

(57) ABSTRACT

It is an object of the present invention to provide an information recording method for recording information in a data rewritable type optical recording medium having a plurality of information recording layers, which can form recording marks having good shapes. In the information recording method according to the present invention, information is recorded in an optical recording medium 10 having at least a stacked L0 layer 20 and L1 layer 30 by projecting a laser beam whose power is modulated thereonto via a light incidence plane 13*a*. When information is recorded, $\lambda/NA$ is set to be equal to or shorter than 700 nm, where $\lambda$ is the wavelength of the laser beam and NA is the numerical aperture of an objective lens for converging the laser beam, and a pulse width $T_{top0}$ of a top pulse of the laser beam when information is to be recorded in the L0 layer 20 is set to be shorter than a pulse width $T_{top1}$ of a top pulse of the laser beam when information is to be recorded in the L1 layer 30.

48 Claims, 8 Drawing Sheets

U.S. PATENT DOCUMENTS

| | | |
|---|---|---|
| 6,236,635 B1 * | 5/2001 | Miyamoto et al. .......... 369/116 |
| 6,771,579 B2 * | 8/2004 | Suzuki .................... 369/59.12 |
| 7,167,431 B2 * | 1/2007 | Miura et al. ............. 369/59.11 |
| 2001/0005350 A1 | 6/2001 | Kitaura et al. ................ 369/94 |
| 2001/0012253 A1 | 8/2001 | Ohno |
| 2002/0006579 A1 | 1/2002 | Ichihara ................. 430/270.13 |
| 2005/0083819 A1 * | 4/2005 | Kato et al. ............... 369/59.11 |
| 2005/0088972 A1 * | 4/2005 | Miura et al. ............. 369/59.12 |
| 2005/0089798 A1 * | 4/2005 | Miura et al. ........... 430/270.11 |
| 2006/0269872 A1 * | 11/2006 | Miura .................. 430/270.12 |

FOREIGN PATENT DOCUMENTS

| | | |
|---|---|---|
| EP | 0 957 477 | 11/1999 |
| EP | 1 117 094 | 7/2001 |
| EP | 1 178 472 | 2/2002 |
| EP | 1 300 836 A2 | 4/2003 |
| JP | 2000-036130 | 2/2000 |
| JP | 2001-273638 | 10/2001 |
| JP | 2003054135 | 2/2003 |

\* cited by examiner

METHOD OF RECORDING INFORMATION IN OPTICAL RECORDING MEDIUM, INFORMATION RECORDING APPARATUS AND OPTICAL RECORDING MEDIUM

BACKGROUND OF THE INVENTION

The present invention relates to a method of recording information in an optical recording medium, and particularly to a method of recording information in a data rewritable type optical recording medium having a plurality of information recording layers. Further, the present invention relates to an information recording apparatus for recording information in an optical recording medium, and particularly to an information recording apparatus for recording information in a data rewritable optical recording medium having a plurality of information recording layers. Furthermore, the present invention relates to an optical recording medium, and particularly to a data rewritable optical recording medium.

DESCRIPTION OF THE PRIOR ART

Optical recording media typified by the CD and the DVD have been widely used as recording media for recording digital data. The recording capacity demanded of such optical recording media has increased year by year, and various proposals have been made to achieve this. One of these proposals is a technique that uses a two-layer structure for the information recording layers contained in the optical recording media, which has found practical application in the DVD-Video and DVD-ROM formats which are read-only optical storage media. With such read-only optical recording media, pre-pits formed on the substrate surface become the information recording layer, and such substrates have a laminated structure with an intervening intermediate layer.

In addition, in recent years, proposals have been made for optical recording media with a two-layer structure for the information recording layer to be used also as an optical recording medium in which data can be rewritten (data rewritable type optical recording medium) (See Japanese Patent Application Laid Open NO. 2001-273638). Such a data rewritable type optical recording medium has a structure in which a recording film and dielectric films between which they are sandwiched form an information recording layer, and these information recording layers are laminated.

A phase change material is generally used for forming a recording film of a data rewritable type optical recording medium and data are recorded utilizing the difference in the reflection coefficients between the case where the recording film is in a crystal phase and the case where it is in an amorphous phase. More specifically, in an unrecorded state, substantially the entire surface of the recording film is in a crystal phase and when data are recorded, the phase of a predetermined region of the recording film is changed to the amorphous phase to form a recording pit. The phase of the phase change material in the crystal phase can be changed to the amorphous phase by heating the phase change material to a temperature equal to or higher than the melting point thereof and quickly cooling it. On the other hand, the phase change material in the amorphous phase can be crystallized by heating the phase change material to a temperature equal to or higher than the crystallization temperature thereof and gradually cooling it.

Such heating and cooling can be performed by adjusting the power (output) of a laser beam. In other words, it is possible not only to record data in an unrecorded recording film but also to directly overwrite (direct-overwrite) a recording mark already formed in a region of the recording film with a different recording mark by modulating the intensity of the laser beam. Generally, the power of the laser beam is modulated in accordance with a pulse waveform having an amplitude between a recording power (Pw) and a bottom power (Pb) in order to heat the recording film to a temperature equal to or higher than the melting point thereof and the power of the laser beam is set to the bottom power (Pb) in order to quickly cool the recording film. Further, in order to heat the recording film to a temperature equal to or higher than the crystallization temperature thereof and gradually cool it, the power of a laser beam is set to an erasing power (Pe). In this case, the erasing power (Pe) is set to a level at which the recording film is heated to a temperature equal to or higher than the crystallization temperature thereof and lower than the melting point thereof, thereby performing so-called solid phase erasing.

Here, in a data rewritable type optical recording medium having two information recording layers, since data are recorded or reproduced by focusing a laser beam onto one of the information recording layers, in the case of recording data in or reproducing data from the information recording layer farther from the light incidence plane (hereinafter referred to as an "L1 layer"), a laser beam is projected thereonto via the information recording layer closer to the light incidence plane (hereinafter referred to as an "L0 layer"). Therefore, since it is necessary for the L0 layer to have a sufficiently high light transmittance, it is general for the L0 layer to include no reflective film or even if the L0 layer includes a reflective film, the thickness of the reflective film is set to be very thin.

Since the L0 layer thus includes no reflective film or even if the L0 layer includes a reflective film, the thickness of the reflective film is set to be very thin in a data rewritable type optical recording medium having two information recording layers, the heat radiation characteristic of the L0 layer is lower than that of the L1 layer including a sufficiently thick reflective film and, therefore, re-crystallization of the phase change material tends to occur. More specifically, since metal is generally used as the material for forming a reflective film, heat generated in the L1 layer by irradiation with a laser beam can be quickly radiated through the reflective film having high thermal conductivity but since the L0 layer includes no reflective film or only a very thin reflective film, heat generated in the L0 layer by irradiation with a laser beam cannot be quickly radiated. A recording mark (an amorphous region) formed in the L0 layer is therefore deformed and a good signal cannot be reproduced.

Particularly, in recent years, attempts have been made to record large quantities of data by setting the quotient ($\lambda$/NA) of the wavelength $\lambda$ of the laser beam used for recording and/or reproducing divided by the numerical aperture (NA) of the objective lens used to focus the laser beam to be equal to or shorter than 700 nm, for example, by setting the numerical aperture NA to 0.7 or greater, e.g. roughly 0.85, and also shortening the wavelength $\lambda$ of the laser beam to about 200 to 450 nm in order to make the focused spot diameter of the laser beam smaller and increase the recording density. In such a system that records and/or reproduces data using a laser beam of short wavelength converged by an objective lens having a high NA, the above mentioned influence of thermal interference becomes great in the L0 layer and the phase change material tends to be re-crystallized.

SUMMARY OF THE INVENTION

Accordingly, it is an object of the present invention to provide an information recording method for recording information in a data rewritable type optical recording medium having a plurality of information recording layers, which can form recording marks having good shapes.

Further, another object of the present invention is to provide an information recording apparatus for recording information in a data rewritable type optical recording medium having a plurality of information recording layers, which can form recording marks having good shapes.

Moreover, a further object of the present invention is to provide a data rewritable type optical recording medium having a plurality of information recording layers, in which recording marks having good shapes can be formed.

The above objects of the present invention can be accomplished by an information recording method for recording information in an optical recording medium having at least stacked first and second information recording layers by projecting a laser beam whose power is modulated thereonto via a light incidence plane, the information recording method comprising steps of setting $\lambda/NA$ to be equal to or shorter than 700 nm, where $\lambda$ is a wavelength of the laser beam and NA is a numerical aperture of an objective lens for converging the laser beam, and setting a pulse width of a top pulse of the laser beam when information is to be recorded in the first information recording layer to be shorter than that when information is to be recorded in the second information recording layer, thereby recording information in the optical recording medium.

The above object of the present invention can be also accomplished by an information recording method for recording information in an optical recording medium having at least stacked first and second information recording layers by projecting a laser beam whose power is modulated thereonto via a light incidence plane, the information recording method comprising steps of setting $\lambda/NA$ to be equal to or shorter than 700 nm, where $\lambda$ is a wavelength of the laser beam and NA is a numerical aperture of an objective lens for converging the laser beam, and setting a pulse width of a multi-pulse of the laser beam when information is to be recorded in the first information recording layer to be shorter than that when information is to be recorded in the second information recording layer, thereby recording information in the optical recording medium.

The above object of the present invention can be also accomplished by an information recording method for recording information in an optical recording medium having at least stacked first and second information recording layers by projecting a laser beam whose power is modulated thereonto via a light incidence plane, the information recording method comprising steps of setting $\lambda/NA$ to be equal to or shorter than 700 nm, where $\lambda$ is a wavelength of the laser beam and NA is a numerical aperture of an objective lens for converging the laser beam, and setting a cooling interval by the laser beam when information is to be recorded in the first information recording layer to be longer than that when information is to be recorded in the second information recording layer, thereby recording information in the optical recording medium.

In a preferred aspect of the present invention, the first information recording layer is located on the side of the light incidence plane with respect to the second information recording layer.

In a further preferred aspect of the present invention, the laser beam has a wavelength $\lambda$ of 200 to 450 nm.

The above object of the present invention can be also accomplished by an information recording method for recording information in an optical recording medium having at least stacked first and second information recording layers by projecting a laser beam whose power is modulated thereonto via a light incidence plane, the information recording method comprising steps of setting a pulse width of a top pulse of the laser beam when information is to be recorded in the first information recording layer to be 0.40 to 0.75 times that when information is to be recorded in the second information recording layer, thereby recording information in the optical recording medium.

The above object of the present invention can be also accomplished by an information recording method for recording information in an optical recording medium having at least stacked first and second information recording layers by projecting a laser beam whose power is modulated thereonto via a light incidence plane, the information recording method comprising steps of setting a pulse width of a multi-pulse of the laser beam when information is to be recorded in the first information recording layer to be 0.48 to 0.58 times that when information is to be recorded in the second information recording layer, thereby recording information in the optical recording medium.

The above object of the present invention can be also accomplished by an information recording method for recording information in an optical recording medium having at least stacked first and second information recording layers by projecting a laser beam whose power is modulated thereonto via a light incidence plane, the information recording method comprising steps of setting a cooling interval by the laser beam when information is to be recorded in the first information recording layer to be 1.25 to 2.00 times that when information is to be recorded in the second information recording layer, thereby recording information in the optical recording medium.

The above object of the present invention can be also accomplished by an information recording apparatus for recording information in an optical recording medium having at least stacked first and second information recording layers by projecting a laser beam whose power is modulated thereonto via a light incidence plane, the information recording apparatus being constituted so as to set $\lambda/NA$ to be equal to or shorter than 700 nm, where $\lambda$ is a wavelength of the laser beam and NA is a numerical aperture of an objective lens for converging the laser beam, and set a pulse width of a top pulse of the laser beam when information is to be recorded in the first information recording layer to be shorter than that when information is to be recorded in the second information recording layer, thereby recording information in the optical recording medium.

The above object of the present invention can be also accomplished by an information recording apparatus for recording information in an optical recording medium having at least stacked first and second information recording layers by projecting a laser beam whose power is modulated thereonto via a light incidence plane, the information recording apparatus being constituted so as to set $\lambda/NA$ to be equal to or shorter than 700 nm, where $\lambda$ is a wavelength of the laser beam and NA is a numerical aperture of an objective lens for converging the laser beam, and set a pulse width of a multi-pulse of the laser beam when information is to be recorded in the first information recording layer to be shorter than that when information is to be recorded in the second information recording layer, thereby recording information in the optical recording medium.

The above object of the present invention can be also accomplished by an information recording apparatus for recording information in an optical recording medium having at least stacked first and second information recording layers by projecting a laser beam whose power is modulated thereonto via a light incidence plane, the information recording apparatus being constituted so as to set λ/NA to be equal to or shorter than 700 nm, where λ is a wavelength of the laser beam and NA is a numerical aperture of an objective lens for converging the laser beam, and set a cooling interval by the laser beam when information is to be recorded in the first information recording layer to be longer than that when information is to be recorded in the second information recording layer, thereby recording information in the optical recording medium.

The above object of the present invention can be also accomplished by an optical recording medium which has at least stacked first and second information recording layers and in which information can be recorded by projecting a laser beam whose power is modulated thereonto via a light incidence plane, the optical recording medium comprising setting information required for setting λ/NA to be equal to or shorter than 700 nm, where λ is a wavelength of the laser beam and NA is a numerical aperture of an objective lens for converging the laser beam, and setting a pulse width of a top pulse of the laser beam when information is to be recorded in the first information recording layer to be shorter than that when information is to be recorded in the second information recording layer, thereby recording information in the optical recording medium.

The above object of the present invention can be also accomplished by an optical recording medium which has at least stacked first and second information recording layers and in which information can be recorded by projecting a laser beam whose power is modulated thereonto via a light incidence plane, the optical recording medium comprising setting information required for setting λ/NA to be equal to or shorter than 700 nm, where λ is a wavelength of the laser beam and NA is a numerical aperture of an objective lens for converging the laser beam, and setting a pulse width of a multi-pulse of the laser beam when information is to be recorded in the first information recording layer to be shorter than that when information is to be recorded in the second information recording layer, thereby recording information in the optical recording medium.

The above object of the present invention can be also accomplished by an optical recording medium which has at least stacked first and second information recording layers and in which information can be recorded by projecting a laser beam whose power is modulated thereonto via a light incidence plane, the optical recording medium comprising setting information required for setting λ/NA to be equal to or shorter than 700 nm, where λ is a wavelength of the laser beam and NA is a numerical aperture of an objective lens for converging the laser beam, and setting a cooling interval by the laser beam when information is to be recorded in the first information recording layer to be shorter than that when information is to be recorded in the second information recording layer, thereby recording information in the optical recording medium.

In a preferred aspect of the present invention, the optical recording medium further comprises a light transmission layer and the light transmission layer has a thickness of 30 to 200 μm.

According to the present invention, recording marks having good shapes can be formed even when information in any one of the information recording layers is directly overwritten.

BRIEF DESCRIPTION OF THE DRAWINGS

FIG. 6 are a set of waveform diagrams showing pulse train patterns used for recording data in an L0 recording film 22 and an L1 recording film 32 wherein FIG. 6(a) shows a case of recording a 2T signal, FIG. 6(b) shows a case of recording a 3T signal, FIG. 6(c) shows a case of recording a 4T signal and FIG. 6(d) shows a case of recording one of a 5T signal to an 8T signal.

DESCRIPTION OF THE PREFERRED EMBODIMENTS

Preferred embodiments of the present invention will be explained in detail with reference to the drawings.

Figure 1:
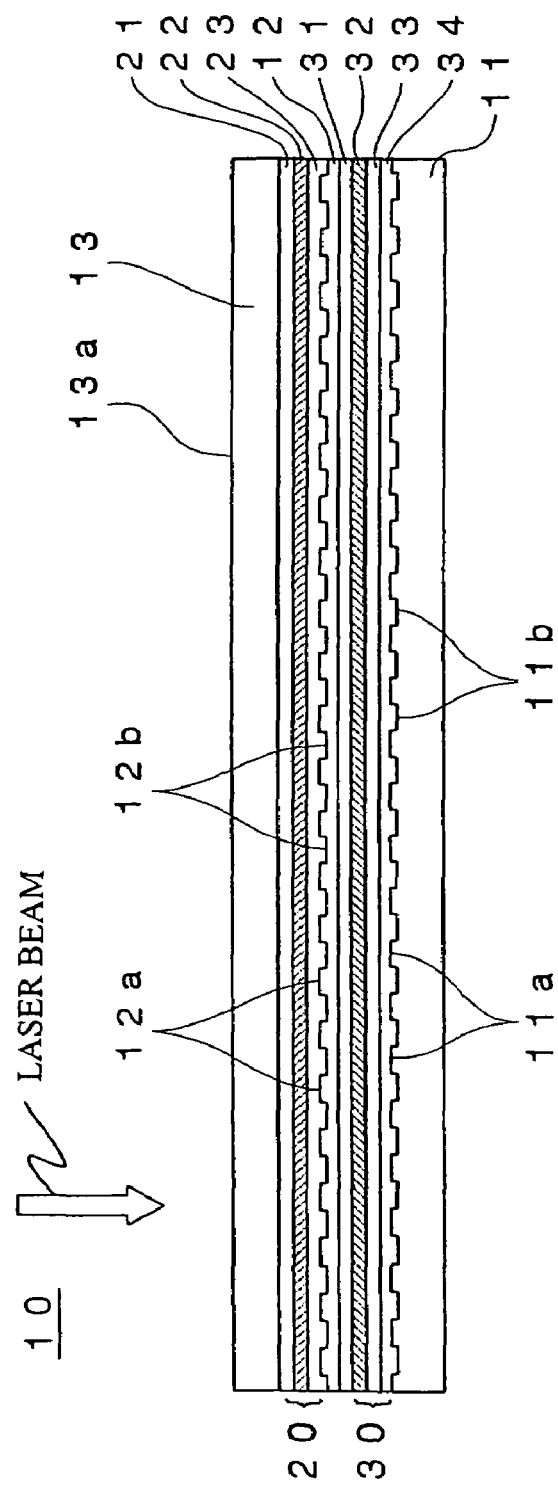
FIG. 1 is a schematic cross section illustrating the structure of an optical recording medium 10 according to a preferred embodiment of the present invention.

FIG. 1 is a schematic cross section illustrating the structure of an optical recording medium 10 according to a preferred embodiment of the present invention.

As shown in FIG. 1, an optical recording medium 10 according to this embodiment includes a substrate 11, an intermediate layer 12, a light transmission layer 13, an L0 layer 20 provided between the intermediate layer 12 and the light transmission layer 13 and an L1 layer 30 provided between the substrate 11 and the intermediate layer 12. The L0 layer 20 constitutes an information recording layer far from a light incidence plane 13a and is constituted by a first dielectric film 21, an L0 recording film 22 and a second dielectric film 23. Further, the L1 layer 30 constitutes an information recording layer close to the light incidence plane 13a and is constituted by a third dielectric film 31, an L1 recording film 32 and a fourth dielectric film 33. In this manner, the optical recording medium 10 according to this embodiment includes two information recording layers (the L0 layer 20 and the L1 layer 30).

The substrate 11 is a disc-like substrate having a thickness of about 1.1 mm serving as a support for ensuring mechanical strength required for the optical recording medium 10 and grooves 11a and lands 11b are formed on the surface thereof. The grooves 11a and/or lands 11b serve as a guide track for the laser beam L when data are to be recorded in the L1 layer 30 or when data are to be reproduced from the L1 layer 30. Although the depth of the groove 11a is not particularly limited, it is preferably set to 10 nm to 40 nm and the pitch of the grooves 11a is preferably set to 0.2 μm to 0.4 μm. Various materials can be used for forming the substrate 11 and the substrate 11 can be formed of glass, ceramic, resin or the like. Among these, resin is preferably used for forming the substrate 11 since resin can be easily shaped. Illustrative examples of resins suitable for forming the substrate 11 include polycarbonate resin, olefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin or olefin resin is most preferably used for forming the substrate 11 from the viewpoint of easy processing, optical characteristics and the like. In this embodiment, since the laser beam L does not pass through the substrate 11, it is unnecessary for the substrate 11 to have a light transmittance property.

The intermediate layer 12 serves to space the L0 layer 20 and the L1 layer 30 apart by a sufficient distance and grooves 12a and lands 12b are formed on the surface thereof. The grooves 12a and/or lands 12b serve as a guide track for the laser beam L when data are to be recorded in the L0 layer 20 or when data are to be reproduced from the L0 layer 20. The depth of the groove 12a and the pitch of the grooves 12a can be set to be substantially the same as those of the grooves 11a formed on the surface of the substrate 11. The depth of the intermediate layer 12 is preferably set to be 10 μm to 50 μm. The material for forming the intermediate layer 12 is not particularly limited and an ultraviolet ray curable acrylic resin is preferably used for forming the intermediate layer 12. It is necessary for the transparent intermediate layer 12 to have sufficiently high light transmittance since the laser beam L passes through the transparent intermediate layer 12 when data are to be recorded in the L1 layer 30 and data recorded in the L1 layer 30 are to be reproduced.

The light transmission layer 13 forms an optical path of a laser beam and a light incident plane 13a is constituted by one of the surfaces thereof. The thickness of the light transmission layer 13 is preferably set to be 30 μm to 200 μm. The material for forming the light transmission layer 13 is not particularly limited and, similarly to the intermediate layer 12, an ultraviolet ray curable acrylic resin is preferably used for forming the light transmission layer 13. As described above, it is necessary for the light transmission layer 13 to have sufficiently high light transmittance since the laser beam L passes through the transparent intermediate layer 13.

Each of the L0 recording film 22 and the L1 recording film 33 is formed of a phase change material. Utilizing the difference in the reflection coefficients between the case where the L0 recording film 22 and the L1 recording film 33 are in a crystal phase and the case where they are in an amorphous phase, data are recorded in the L0 recording film 23 and the L1 recording film 33. The material for forming the L0 recording film 22 and the L1 recording film 33 is not particularly limited but it is preferable to form them using a SbTe system material. As the SbTe system material, SbTe may be used alone, or InSbTeGe, AgInSbTe, AgSbTeGe, AgInSbTeGe or the like containing In, Te, Ge, Ag or the like as additives may be used.

Since the laser beam passes through the L0 recording film 22 when data are recorded in the L1 layer 30 and data recorded in the L1 layer 30 are reproduced, it is necessary for the L0 layer 20 to have a high light transmittance. Therefore, the thickness of the L0 recording film 22 is set to be considerably thinner than that of the L1 recording film 32. Concretely, it is preferable to set the thickness of the L1 recording film 32 to be about 3 to 20 nm and the thickness of the L0 recording film 22 to be 0.3 to 0.8 times that of the L1 recording film 32.

The first dielectric film 21 and the second dielectric film 23 formed so as to sandwich the L0 recording film 22 serve as protective films for the L0 recording film 22 and the third dielectric film 31 and the fourth dielectric film 33 formed so as to sandwich the L1 recording film 32 serve as protective films for the L10 recording film 32. The thickness of the first dielectric film 21 is preferably set to be 2 to 200 nm, the thickness of the second dielectric film 23 is preferably set to be 2 to 200 nm, the thickness of the third dielectric film 31 is preferably set to be 2 to 200 nm and the thickness of the fourth dielectric film 33 is preferably set to be 2 to 200 nm.

Each of these dielectric films may have a single-layered structure or may have a multi-layered structure including a plurality of dielectric films. The material for forming each of these dielectric films is not particularly limited but it is preferable to form it of oxide, nitride, sulfide, carbide of Si, Al, Ta and Zn such as $SiO_2$, $Si_3O_4$, $Al_2O_3$, AlN, TaO, ZnS, $CeO_2$ and the like or a combination thereof.

The reflective film 34 serves to reflect the laser beam entering through the light incident plane 13a so as to emit it from the light incident plane 13a and the thickness thereof is preferably set to be 20 to 200 nm. The material for forming the reflective film 34 is not particularly limited but the reflective film 34 is preferably formed of an alloy containing Ag or Al as a primary component and may be formed of Au, Pt or the like. Further, a moisture proof film may be provided between the reflective film 34 and the substrate 11 in order to prevent the reflective film 34 from being corroded. Materials usable for forming each of the first dielectric film 21 to the fourth dielectric film 33 can be used for forming the moisture proof film. Further, although the L0 layer 20 includes no reflective film, a thin reflective film having a thickness of about 3 to 15 nm may be provided in the L0 layer 20. In this case, the reflective film can be formed of the same material as used for forming the reflective film 34.

When data are recorded in the thus constituted optical recording medium 10, a laser beam having a wavelength of 200 to 450 nm is projected onto the optical recording medium 10 via the light incidence plane 13a and the amount of the laser beam reflected from the optical recording medium 10 is detected. As described above, since the L0 recording film 22 and the L1 recording film 32 are formed of the phase change material and the reflection coefficient in the case where the phase change material is in the crystal phase and that in the case where it is in the amorphous phase are different from each other, it is possible to judge by projecting the laser beam via the light incidence plane 13a, focusing it onto one of the L0 recording film 22 and the L1 recording film 32 and detecting the amount of the laser beam reflected therefrom whether a region of the L0 recording film 22 or the L1 recording film 32 irradiated with the laser beam is in the crystal phase or the amorphous phase.

When data are to be recorded in the optical recording medium 10, a laser beam having a wavelength of 200 to 450 nm is projected to be focused onto one of the L0 recording film 22 and the L1 recording film 32 and in accordance with data to be recorded therein, a predetermined region of one of the L0 recording film 22 and the L1 recording film 32 is heated to a temperature equal to or higher than the melting point thereof and quickly cooled, thereby changing the phase thereof to the amorphous phase or a predetermined region of one of the L0 recording film 22 and the L1 recording film 32 is heated to a temperature equal to or higher than the crystallization temperature and gradually cooled, thereby changing the phase thereof to the crystal phase. The region whose phase has been changed to the amorphous phase is referred to as "a recording mark" and recorded data are expressed by the length from the starting point of the recording mark to the ending point thereof and the length from the ending point thereof to the starting point of the next recording mark. The length of each recording mark and the length between recording marks (edge to edge) are set to one of the lengths corresponding to 2T through 8T (where T is the clock period) when adopting the (1,7) RLL modulation scheme, although this is no particular limitation. A pulse train pattern used for recording data in the L0 recording film 22 and a pulse train pattern used for recording data in the L1 recording film 32 will be described later.

When recording data in or reproducing data from the L1 layer 30, a laser beam is projected onto the L1 recording film 32 via the L0 layer 20. Therefore, it is necessary for the L0 layer 20 to have a high light transmittance and, as pointed out above, the thickness of the L0 recording film 22 is set to be considerably thinner than that of the L1 recording film 32.

Here follows a description of the method of manufacturing an optical recording medium 10 according to this preferred embodiment.

FIGS. 2 to 5 are step drawings illustrating the method of manufacturing the optical recording medium 10.

Figure 2:
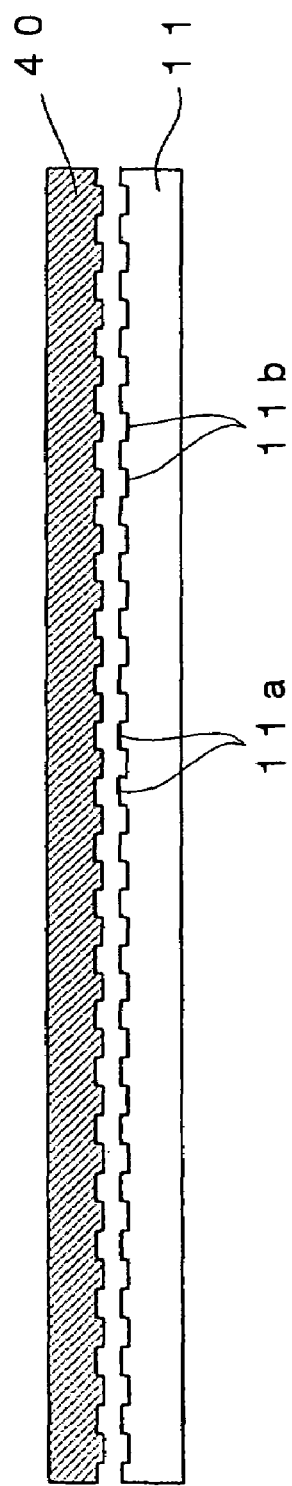
FIG. 2 is a drawing illustrating a part of a process (a step for forming a substrate 11) for manufacturing an optical recording medium 10.
Figure 3:
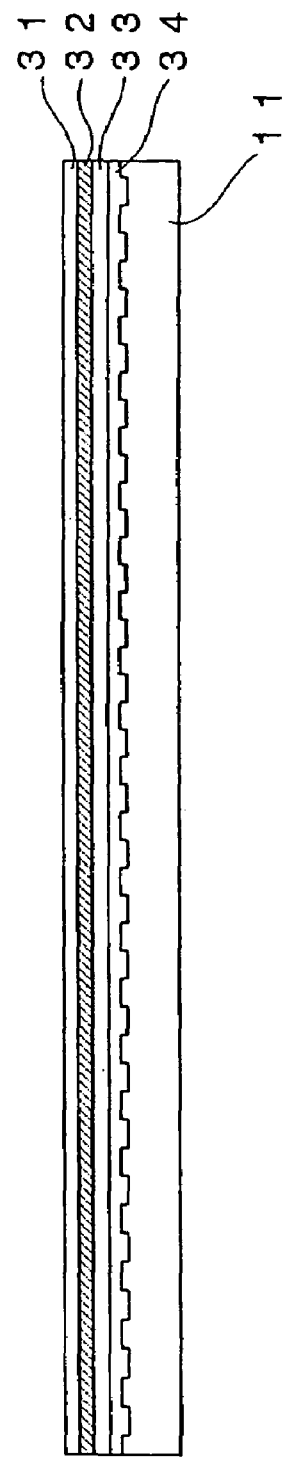
FIG. 3 is a drawing illustrating a part of a process (a step for forming an L1 layer 30) for manufacturing an optical recording medium 10.
Figure 5:
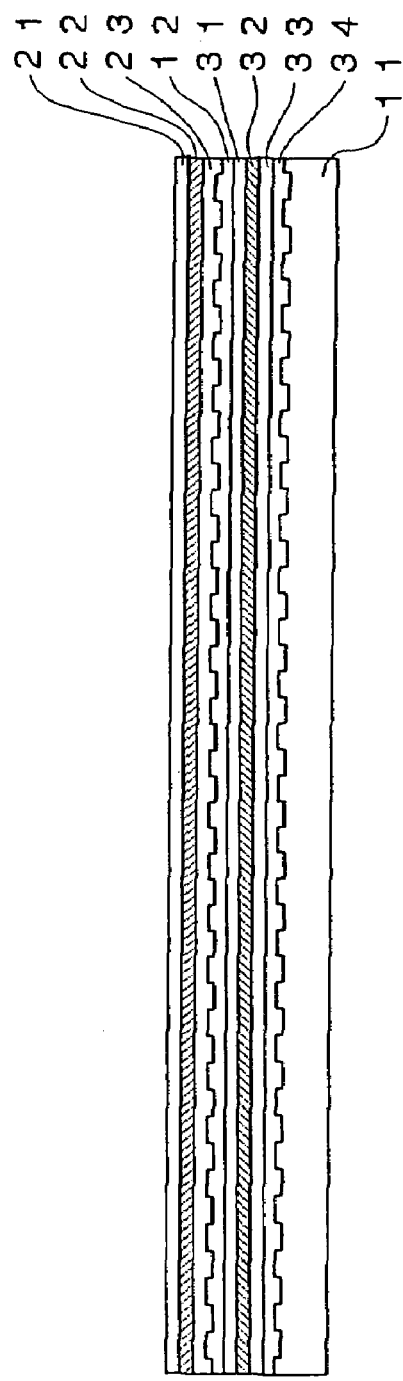
FIG. 5 is a drawing illustrating a part of a process (a step for forming an L0 layer 20) for manufacturing an optical recording medium 10.

First, as shown in FIG. 2, a stamper 40 is used to perform injection molding of a substrate 11 having grooves 11a and lands 11b. Next, as shown in FIG. 5, the sputtering method is used to form, upon nearly the entire surface of the side of the substrate 11 on which the grooves 11a and the lands 11b are formed, a reflective film 34, a fourth dielectric film 33, an L1 recording film 32 and a third dielectric film 34 in this order, thereby forming an L1 layer 30. Here, the phase of the L1 recording film 32 is normally in an amorphous phase immediately after the sputtering is completed.

Figure 4:
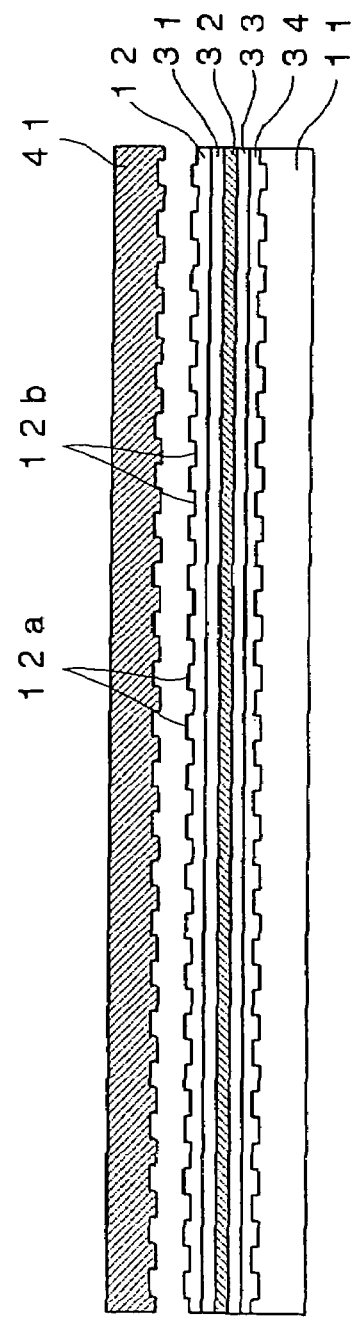
FIG. 4 is a drawing illustrating a part of a process (a step for forming a transparent intermediate layer 12) for manufacturing an optical recording medium 10.
Figure 7:
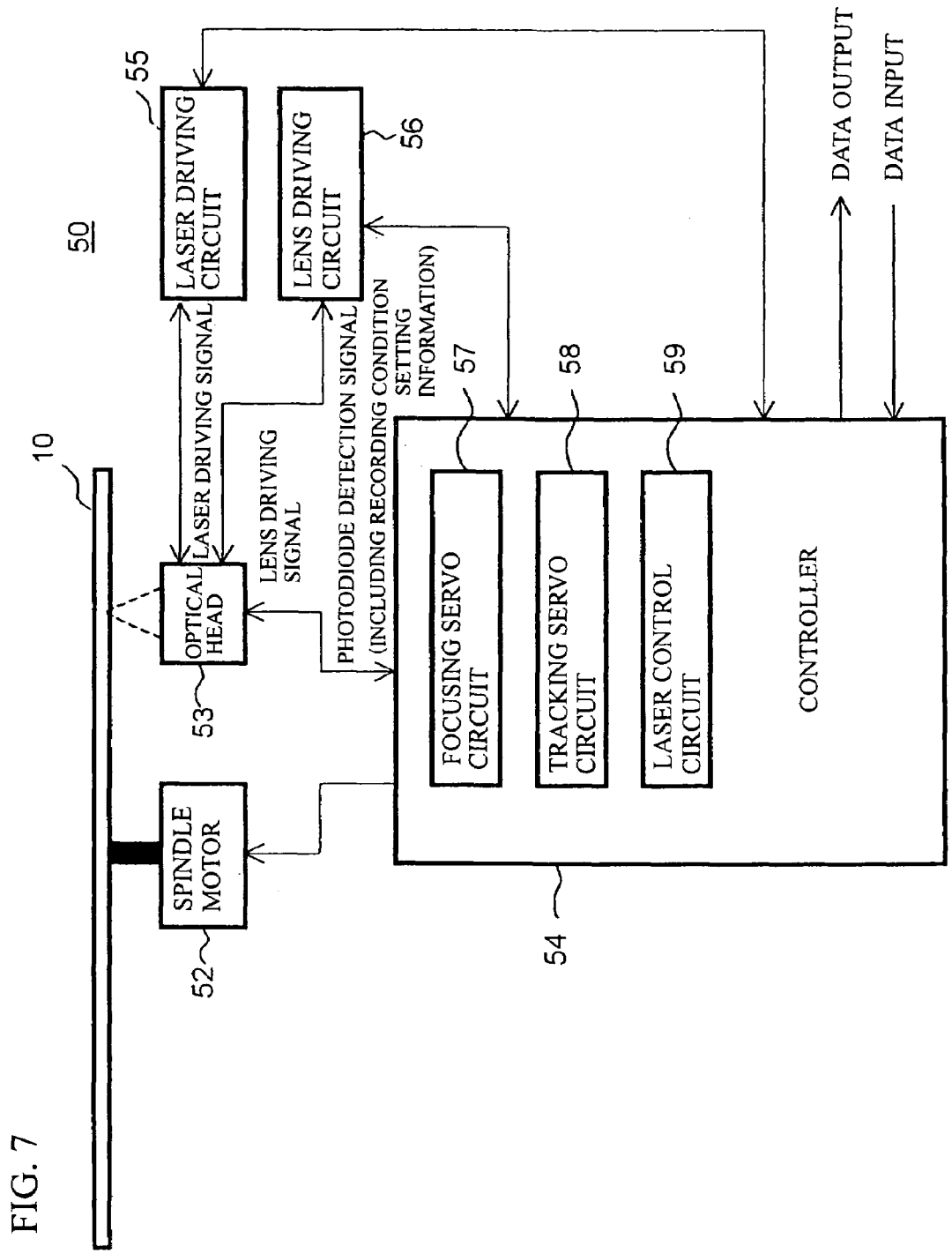
FIG. 7 is a schematic drawing of the major components of an information recording apparatus 50 for recording data in an optical recording medium 10.

Next, as shown in FIG. 4, ultraviolet curable acrylic resin is spin-coated onto the L1 layer 30, and by shining an ultraviolet ray through a stamper 41 in the state with its surface covered with the stamper 41, an intermediate layer 12 having grooves 12a and lands 12b is formed. Next, as shown in FIG. 7, the sputtering method is used to form, upon nearly the entire surface of the intermediate layer 12 on which the grooves 11a and the lands 11b are formed, a second dielectric film 23, an L0 recording film 22 and a first dielectric film 21 in this order. Thus, an L0 layer 20 is completed. Here, the phase of the L0 recording film 22 is normally in an amorphous phase immediately after the sputtering is completed.

Moreover, as shown in FIG. 1, ultraviolet curable acrylic resin is spin-coated onto the L0 layer 20, and by shining an ultraviolet ray, a light transmission layer 13 is formed. This completes all film deposition steps. In this specification, the optical recording medium in the state with the film deposition steps complete may also be called the "optical recording medium precursor."

Next, the optical recording medium precursor is placed upon the rotary table of a laser irradiation apparatus (not shown) and rotated while being continuously irradiated with a rectangular laser beam having a shorter length in the direction along the track and a longer length in the direction perpendicular to the track. By shifting the irradiation position in the direction perpendicular to the track each time the optical recording medium precursor makes one revolution, the rectangular laser beam can be shined over nearly the entire surface of the L0 recording film 22 and the L1 recording film 32. Thereby, the phase change material making up the L0 recording film 22 and the L1 recording film 32 is heated to a temperature equal to or higher than the crystallization temperature thereof and then cooled slowly, so the entire surface of the L0 recording film 22 and the L1 recording film 32 is put into the crystalline state, namely the unrecorded state. This process is called "an initializing process" in this specification.

When the initializing process is completed, the optical recording medium 10 is competed.

As described above, it is possible to record the desired digital data onto an optical recording medium 10 thus manufactured by aligning the focus of the laser beam during recording to either the L0 recording film 22 or the L1 recording film 32 to form recording marks. In addition, when data is recorded onto the L0 recording film 22 and/or L1 recording film 32 of the optical recording medium 10 in this manner, as described above, by aligning the focus of a laser beam set to playback power to either the L0 recording film 22 or the L1 recording film 32 and detecting the amount of light reflected, it is possible to play back the digital data thus recorded.

Next, a pulse train pattern used for recording data in the L0 recording film 22 and a pulse train pattern used for recording data in the L1 recording film 32 will be described in detail.

Figure 6:
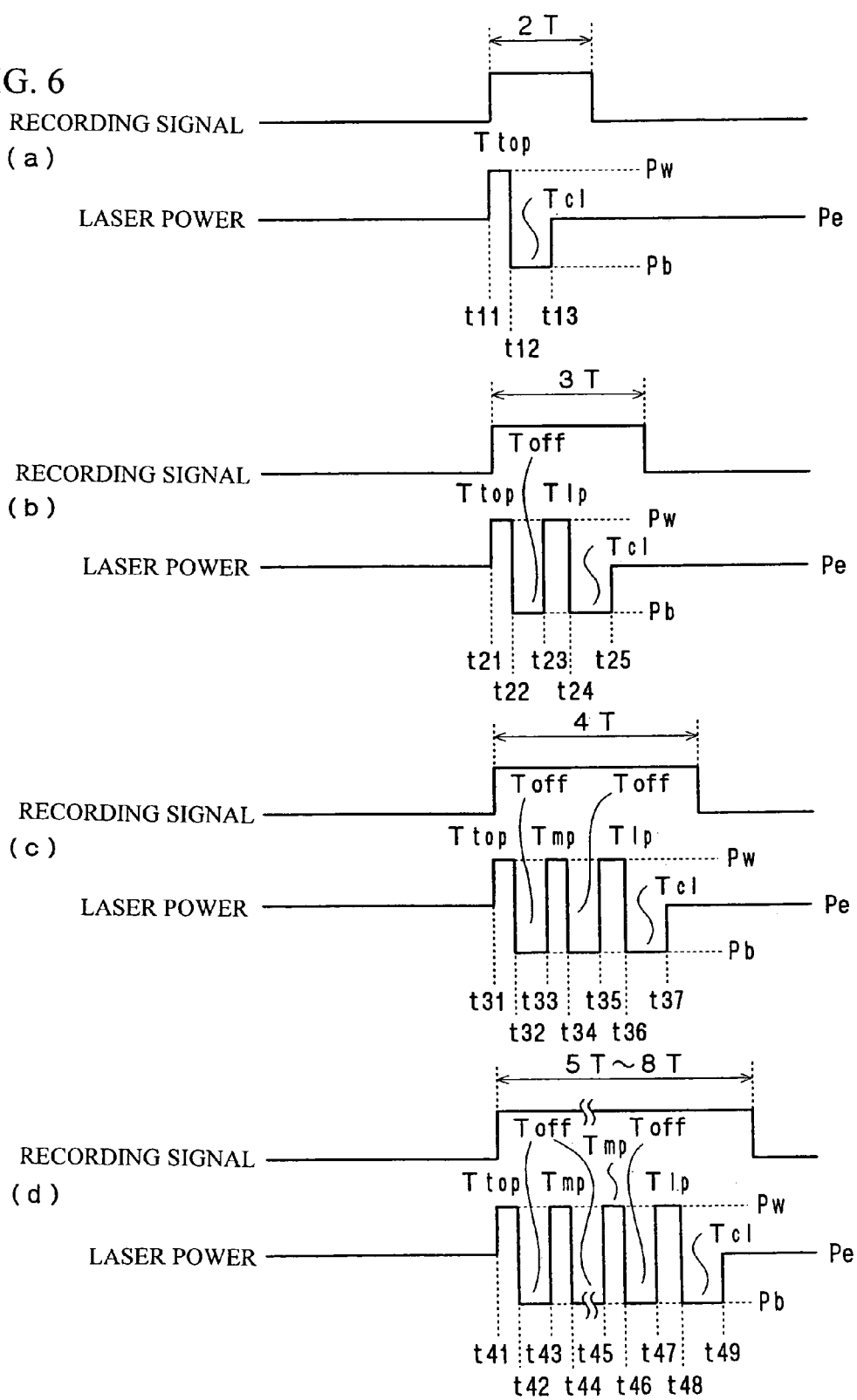

FIG. 6 are a set of waveform diagrams showing pulse train patterns used for recording data in the L0 recording film 22 and the L1 recording film 32 wherein FIG. 6(a) shows a case of recording a 2T signal, FIG. 6(b) shows a case of recording a 3 T signal, FIG. 6(c) shows a case of recording a 4T signal and FIG. 6(d) shows a case of recording one of a 5T signal to an 8T signal.

As shown in FIGS. 6(a) to (d), in this embodiment, when data are to be recorded in the L0 recording film 22 or the L1 recording film 32, the power of a laser beam is modulated between three levels (three values) of a recording power (Pw), an erasing power (Pe) and a bottom power (Pb). The level of the recording power (Pw) is set to such a high level that the L0 recording film 22 or the L1 recording film 32 can be melted by the irradiation with the laser beam and is set to Pw0 when data are to be recorded in the L0 recording film 22 and Pw1 when data are to be recorded in the L1 recording film 32. The level of the erasing power (Pe) is set to such a level that the L0 recording film 22 or the L1 recording film 32 can be heated to a temperature equal to or higher than a crystallization temperature thereof and is set to Pe0 with respect to data recorded in the L0 recording film 22 and Pe1 with respect to data recorded in the L1 recording film 32. The level of the bottom power (Pb) is set to such a low level that the melted L0 recording film 22 or L1 recording film 32 can be cooled even if it is irradiated with the laser beam and is set to Pb0 when data are to be recorded in the L0 recording film 22 and Pb1 when data are to be recorded in the L1 recording film 32.

The details of the recording power (Pw0, Pw1), the erasing power (Pe0, Pe1) and the bottom power (Pb0, Pb1) will be described later. Hereinafter, a reference to simply the recording power (Pw), erasing power (Pe) or bottom power (Pb) means the recording power (Pw0), erasing power (Pe0) or bottom power (Pb0) when data are to be recorded in the L0 recording film 22 and means the recording power (Pw1), erasing power (Pe1) or bottom power (Pb1) when data are to be recorded in the L1 recording film 32.

First, as shown in FIG. 6(a), in the case of recording a 2T signal in the L0 recording film 22 or the L1 recording film 32, the number of pulses is set to 1 and a cooling interval $T_{cl}$ is inserted thereafter. Here, the number of pulses is defined by the number of times the power of the laser beam is raised to the recording power (Pw). Further, in this specification, a first pulse is defined as a top pulse, a final pulse is defined as a last pulse and any pulse present between the top pulse and the last pulse is defined as a multi-pulse. However, in the case where the number of pulses is set to 1 as shown in FIG. 6(a), the pulse is the top pulse.

At the cooling interval $T_{cl}$, the power of a laser beam is set to the bottom power (Pb). In this manner, in this specification, a last interval during which the power of a laser beam is set to the bottom power (Pb) is defined as the cooling interval. Therefore, in the case of recording a 2T signal, the power of the laser beam is set to the erasing power (Pe) before the time $t_{11}$, set to the recording power (Pw) during the period ($T_{top}$) from the time $t_{11}$ to the time $t_{12}$, set to the bottom power (Pb) during the period ($T_{cl}$) from the time $t_{12}$ to the time $t_{13}$ and set to the erasing power (Pe) after the time $t_{13}$.

Further, as shown in FIG. 6(b), in the case of recording a 3T signal in the L0 recording film 22 or the L1 recording film 32, the number of pulses is set to 2 and a cooling interval is inserted thereafter. Therefore, in the case of recording a 3T signal, the power of the laser beam is set to the erasing power (Pe) before the time $t_{21}$, set to the recording power (Pw) during the period ($T_{top}$) from the time $t_{21}$ to the time $t_{22}$ and the period ($T_{lp}$) from the time $t_{23}$ to the time $t_{24}$, set to the bottom power (Pb) during the period ($T_{off}$) from the time $t_{22}$ to the time $t_{23}$ and the period ($T_{cl}$) from the time $t_{24}$ to the time $t_{25}$ and set to the erasing power (Pe) after the time $t_{25}$.

Furthermore, as shown in FIG. 6(c), in the case of recording a 4T signal in the L0 recording film 22 or the L1 recording film 32, the number of pulses is set to 3 and a cooling interval is inserted thereafter. Therefore, in the case of recording a 4T signal, the power of the laser beam is set to the erasing power (Pe) before the time $t_{31}$, set to the recording power (Pw) during the period ($T_{top}$) from the time $t_{31}$ to the time $t_{32}$, the period ($T_{mp}$) from the time $t_{33}$ to the time $t_{34}$ and the period ($T_{lp}$) from the time $t_{35}$ to the time $t_{36}$, set to the bottom power (Pb) during the period ($T_{off}$) from the time $t_{32}$ to the time $t_{33}$, the period ($T_{off}$) from the time $t_{34}$ to the time $t_{35}$ and the period ($T_{cl}$) from the time $t_{36}$ to the time $t_{37}$ and set to the erasing power (Pe) after the time $t_{37}$.

In addition, as shown in FIG. 6(d), in the case of recording any one of a 5T signal to an 8T signal in the L0 recording film 22 or the L1 recording film 32, the number of pulses is correspondingly set to one of 4 to 7 and a cooling interval $T_{cl}$ is inserted thereafter. Therefore, the number of multi-pulses is set to 2 to 5 correspondingly to a 5T signal to an 8T signal. In this case, the power of the laser beam is set to the recording power (Pw) during the period $T_{top}$ from the time $t_{41}$ to the time $t_{42}$, the periods $T_{mp}$ corresponding to those from the time $t_{43}$ to the time $t_{44}$, from the time $t_{45}$ to the time $t_{46}$ and the like and the period $T_{lp}$ from the time $t_{47}$ to the time $t_{48}$, set to the bottom power (Pb) during the off periods $T_{off}$ corresponding to those from the time $t_{42}$ to the time $t_{43}$, from the time $t_{46}$ to the time $t_{47}$ and the like and the cooling interval $T_{cl}$ from the time $t_{48}$ to the time $t_{49}$, and set to the erasing power (Pe) during the other periods.

As a result, at a region where one of recording signals among a 2T signal to a 8T signal is to be recorded, the L0 recording film 22 or the L1 recording film 32 melted by the irradiation with the laser beam of the recording power (Pw1) is quickly cooled during the cooling interval $T_{cl}$ and the phase thereof is changed to the amorphous phase. On the other hand, at the other regions, the L0 recording film 22 or the L1 recording film 32 is heated to a temperature equal to or higher than the crystallization temperature thereof and gradually cooled as the laser beam moves away, thereby being crystallized.

Here, in the case of recording data in the L0 recording film 22, each of the pulse width $T_{top}$ of the top pulse, the pulse width $T_{mp}$ of each of the multi-pulses, the pulse width $T_{lp}$ of the last pulse and the cooling interval $T_{cl}$ is set to be constant when any one of a 2T signal to a 8T signal is to be recorded. Hereinafter, the pulse width of the top pulse, the pulse width of each of the multi-pulses, the pulse width of the last pulse and the cooling interval in the case of recording data in the L0 recording film 22 are referred to as $T_{top0}$, $T_{mp0}$, $T_{lp0}$ and $T_{cl0}$. Similarly, in the case of recording data in the L1 recording film 32, each of the pulse width $T_{top}$ of the top pulse, the pulse width $T_{mp}$ of each of the multi-pulses, the pulse width $T_{lp}$ of the last pulse and the cooling interval $T_{cl}$ is set to be constant when any one of a 2T signal to a 8T signal is to be recorded and, hereinafter, the pulse width of the top pulse, the pulse width of each of the multi-pulses, the pulse width of the last pulse and the cooling interval in the case of recording data in the L0 recording film 22 are referred to as $T_{top1}$, $T_{mp1}$, $T_{lp1}$, and $T_{cl1}$. However, reference to simply $T_{top}$, $T_{mp}$, $T_{lp}$ or $T_{cl}$ means $T_{top0}$, $T_{mp0}$, $T_{lp0}$ or $T_{cl0}$ when data are to be recorded in the L0 recording film 22 and means $T_{top1}$, $T_{mp1}$, $T_{lp1}$ or $T_{cl1}$ when data are to be recorded in the L1 recording film 32.

As described above, the L0 layer 20 is provided with no reflective layer or only a very thin reflective film (3 to 15 nm) even if it includes a reflective film, while the L1 layer 30 is provided with the reflective film 34 having a thickness of 20 to 200 nm. Therefore, the heat radiation characteristic of the L0 layer 20 is lower than that of the L1 layer 30 and the phase change material contained in the L0 layer 20 tends to be re-crystallized.

In view of this, in this embodiment, in order to prevent the phase change material contained in the L0 layer 20 from being re-crystallized, the ratio (Pe0/Pw0) of the recording power (Pw0) and the erasing power (Pe0) when data are to be recorded in the L0 recording film 22 is set to be smaller than the ratio (Pe1/Pw1) of the recording power (Pw1) and the erasing power (Pe1) when data are to be recorded in the L1 recording film 32, thereby reducing thermal interference in the L0 layer 20 in which only a low cooling effect is obtained to suppress the re-crystallization of the phase change material contained in the L0 layer 20. In this case, if the ratio (Pe0/Pw0) is set too low with respect to the ratio (Pe1/Pw1), the erasing efficiency in the L0 layer 20 becomes low. On the other hand, if the ratio (Pe0/Pw0) is set to be too close to the ratio (Pe1/Pw1), thermal interference cannot be reduced in a desired manner and it is difficult to prevent the phase change material contained in the L0 layer 20 from being re-crystallized. Therefore, it is preferable to set the ratio (Pe0/Pw0) to be about 0.38 to 0.66 times the ratio (Pe1/Pw1), is more preferable to set it to be about 0.44 to 0.55 times the ratio (Pe1/Pw1) and is particularly preferable to set it to be about 0.50 times the ratio (Pe1/Pw1). If the relationship between the ratio (Pe0/Pw0) and the ratio (Pe1/Pw1) is set in this manner, the erasing efficiency can be maintained within a suitable range for practical use and thermal interference can be effectively reduced.

However, when data are to be recorded in the L1 recording film 32, since the laser beam is projected onto the L1 recording film 32 via the L0 layer 20, the laser beam has been considerably attenuated when it reaches the L1 recording film 32. Therefore, in order to sufficiently melt the L1 recording film 32, it is necessary to set the recording power (Pw1) to be higher than the recording power (Pw0) used for recording data in the L0 recording film 22, namely, Pw0<Pw1.

Further, in this embodiment, in order to prevent the phase change material contained in the L0 layer 20 from being re-crystallized, the pulse width $T_{top0}$ of the top pulse when data are to be recorded in the L0 layer 20 is set to be shorter than the pulse width $T_{top1}$ of the top pulse when data are to be recorded in the L1 layer 30, thereby further reducing thermal interference in the L0 layer 20 in which only a low cooling effect is obtained to more effectively suppress the re-crystallization of the phase change material contained in the L0 layer 20. In this case, if the pulse width $T_{top0}$ is set too short with respect to the pulse width $T_{top1}$, there is a risk of the L0 recording film 22 not being heated to a temperature equal to or higher than the melting point thereof. On the other hand, if the pulse width $T_{top0}$ is set close to the pulse width $T_{top1}$, thermal interference cannot be reduced in a desired manner and it is difficult to prevent the phase change material contained in the L0 layer 20 from being re-crystallized. Therefore, it is preferable to set the pulse width $T_{top0}$ to be about 0.40 to 0.75 times the pulse width $T_{top1}$, is more preferable to set it to be about 0.49 to 0.55 times the pulse width $T_{top1}$ and is particularly preferable to set it to be about 0.55 times the pulse width $T_{top1}$. If the relationship between the pulse width $T_{top0}$ and the pulse width $T_{top1}$ is set in this manner, it is possible to reliably heat the L0 recording film 22 to a temperature equal to or higher than the melting point thereof and thermal interference can be effectively reduced. Here, the pulse widths of $T_{lp0}$ and $T_{lp1}$ can be set to be equal to the pulse widths $T_{top0}$ and $T_{top1}$.

Furthermore, in this embodiment, in order to prevent the phase change material contained in the L0 layer 20 from being re-crystallized, the pulse width $T_{mp0}$ of each of the multi-pulses when data are to be recorded in the L0 layer 20 is set to be shorter than the pulse width $T_{mp1}$ of each of the multi-pulses when data are to be recorded in the L1 layer 30, thereby further reducing thermal interference in the L0 layer 20 in which only a low cooling effect is obtained to more effectively suppress the re-crystallization of the phase change material contained in the L0 layer 20. In this case, if the pulse width $T_{mp0}$ is set too short with respect to the pulse width $T_{mp1}$, there is a risk of the L0 recording film 22 not being heated to a temperature equal to or higher than the melting point thereof. On the other hand, if the pulse width $T_{mp0}$ is set close to the pulse width $T_{mp1}$, thermal interference cannot be reduced in a desired manner and it is difficult to prevent the phase change material contained in the L0 layer 20 from being re-crystallized. Therefore, it is preferable to set the pulse width $T_{mp0}$ to be about 0.48 to 0.58 times the pulse width $T_{mp1}$, is more preferable to set it to be about 0.50 to 0.53 times the pulse width $T_{mp1}$ and is particularly preferable to set it to be about 0.50 times the pulse width $T_{mp1}$. If the relationship between the pulse width $T_{mp0}$ and the pulse width $T_{mp1}$ is set in this manner, it is possible to reliably heat the L0 recording film 22 to a temperature equal to or higher than the melting point thereof and thermal interference can be effectively reduced.

Moreover, in this embodiment, in order to prevent the phase change material contained in the L0 layer 20 from being re-crystallized, the cooling interval $T_{cl0}$ when data are to be recorded in the L0 layer 20 is set to be longer than the cooling interval $T_{cl1}$ when data are to be recorded in the L1 layer 30, thereby further reducing thermal interference in the L0 layer 20 in which only a low cooling effect is obtained to more effectively suppress the re-crystallization of the phase change material contained in the L0 layer 20. In this case, if the cooling interval $T_{cl0}$ is set too long with respect to the cooling interval $T_{cl1}$, the erasing efficiency in the L0 recording film 22 becomes low. On the other hand, if the cooling interval $T_{cl0}$ is set close to the cooling interval $T_{cl1}$, thermal interference cannot be reduced in a desired manner and it is difficult to prevent the phase change material contained in the L0 layer 20 from being re-crystallized. Therefore, it is preferable to set the cooling interval $T_{cl0}$ to be about 1.25 to 2.00 times the cooling interval $T_{cl1}$, is more preferable to set it to be about 1.25 to 1.50 times the cooling interval $T_{cl1}$ and is particularly preferable to set it to be about 1.25 times the cooling interval $T_{cl1}$. If the relationship between the cooling interval $T_{cl0}$ and the cooling interval $T_{cl1}$ is set in this manner, the erasing efficiency can be maintained within a suitable range for practical use and thermal interference can be effectively reduced.

It is preferable to store "recording condition setting information" in the optical recording medium 10 as information for identifying the pulse train patterns for the L0 recording film 22 and the L1 recording film 32. If such recording condition setting information is stored in the optical recording medium 10, the recording condition setting information is read by an information recording apparatus when data are actually recorded in the optical recording medium 10 by the user, and the pulse train patterns can be determined based on the thus read recording condition setting information. Therefore, for example, when the user requests recording of data in the L0 layer 20, the information recording apparatus sets the recording power, the erasing power and the bottom power to Pw0, Pe0 and Pb0, respectively, sets the pulse width of the top pulse, the pulse width of each of the multi-pulses, the pulse width of the last pulse and the cooling interval to $T_{top0}$, $T_{mp0}$, $T_{lp0}$ and $T_{cl0}$, respectively, and records data in the L0 recording film 22. On the other hand, when the user requests recording of data in the L1 layer 30, the information recording apparatus sets the recording power, the erasing power and the bottom power to Pw1, Pe1 and Pb1, respectively, sets the pulse width of the top pulse, the pulse width of each of the multi-pulses, the pulse width of the last pulse and the cooling interval to $T_{top1}$, $T_{mp1}$, $T_{lp1}$ and $T_{cl1}$, respectively, and records data in the L1 recording film 32.

It is more preferable for the recording condition setting information to include not only information required for identifying the pulse train patterns for the L0 recording film 22 and the L1 recording film 32 but also information required for identifying various conditions such as the linear recording velocity required to record data in the optical recording medium 10. The recording condition setting information may be recorded in the optical recording medium 10 as a wobble signal or pre-pits, or it may be recorded as data in the L0 recording film 22 and/or the L1 recording film 32. Further, the recording condition setting information may include not only information directly indicating various conditions required to record data but also information capable of indirectly identifying the pulse train patterns by specifying any of various conditions stored in the information recording apparatus in advance.

FIG. 7 is a schematic drawing of the major components of an information recording apparatus 50 for recording data in the optical recording medium 10.

As shown in FIG. 7, the information recording apparatus 50 is equipped with a spindle motor 52 for rotating an optical recording medium 10, an optical head 53 for shining a laser beam onto the optical recording medium 10, a controller 54 for controlling the operation of the spindle motor 52 and the optical head 53, a laser driving circuit 55 that supplies a laser driving signal to the optical head 53, and a lens driving circuit 56 that supplies a lens driving signal to the optical head 53.

Moreover, as shown in FIG. 7, the controller 54 includes a focusing servo circuit 57, a tracking servo circuit 58, and a laser control circuit 59. When the focusing servo circuit 57 is activated, the focus is aligned with the recording surface of the rotating optical recording medium 10, and when the tracking servo circuit 58 is activated, the spot of the laser beam begins to automatically track the eccentric signal track of the optical recording medium 10. The focusing servo circuit 57 and tracking servo circuit 58 are provided with an auto gain control function for automatically adjusting the focusing gain and an auto gain control function for automatically adjusting the tracking gain, respectively. In addition, the laser control circuit 59 is a circuit that generates the laser driving signal supplied by the laser driving circuit 55 and generates a laser driving signal based on recording condition setting information recorded on the optical recording medium 10.

Note that the focusing servo circuit 57, tracking servo circuit 58 and laser control circuit 59 need not be circuits incorporated in the controller 54 but can instead be components separate of the controller 54. Moreover, they need not be physical circuits but can instead be accomplished by software programs executed in the controller 54.

In the case of recording data in the optical recording medium 10 using the thus constituted information recording apparatus 50, as described above, the recording condition setting information recorded in the optical recording medium 10 is read and pulse train patterns are determined based on the thus read recording condition setting information. Therefore, in the case of recording data in the L0 layer 20, the information recording apparatus 50 uses the thus read recording condition setting information to set the recording power, the erasing power and the bottom power to Pw0, Pe0 and Pb0, respectively and set the pulse width of the top pulse, the pulse width of each of the multi-pulses, the pulse width of the last pulse and the cooling interval to $T_{top0}$, $T_{mp0}$, $T_{lp0}$ and $T_{cl0}$, respectively, and then records data in the L0 recording film 22. On the other hand, in the case of recording data in the L1 layer 30, the information recording apparatus 50 uses the thus read recording condition setting information to set the recording power, the erasing power and the bottom power to Pw1, Pe1 and Pb1, respectively, and set the pulse width of the top pulse, the pulse width of each of the multi-pulses, the pulse width of the last pulse and the cooling interval to $T_{top1}$, $T_{mp1}$, $T_{lp1}$ and $T_{cl1}$, respectively, and then records data in the L1 recording film 32.

As described above, in this embodiment, in the case of recording data in the L0 layer 20 close to the light incidence plane 13a, since the ratio (Pe0/Pw0) of the recording power (Pw0) and the erasing power (Pe0) is set to be smaller than the ratio (Pe1/Pw1) of the recording power (Pw1) and the erasing power (Pe1) in the case of recording data in the L1 layer 30 far from the light incidence plane 13a, it is possible to further reduce thermal interference in the L0 layer 20 in which only a low cooling effect is obtained and it is possible to suppress the re-crystallization of the phase change material contained in the L0 layer 20.

Further, in this embodiment, in the case of recording data in the L0 layer 20 close to the light incidence plane 13a, since the pulse width $T_{top0}$ of the top pulse, the pulse width $T_{mp0}$ of each of the multi-pulses and the pulse width $T_{lp0}$ of the last pulse are set to be shorter than the pulse width $T_{top1}$ of the top pulse, the pulse width $T_{mp1}$ of each of the multi-pulses and the pulse width $T_{lp1}$ of the last pulse in the case of recording data in the L1 layer 30 far from the light incidence plane 13a and the cooling interval $T_{cl0}$ is set to be longer than cooling interval $T_{cl1}$ in the case of recording data in the L1 layer 30 far from the light incidence plane 13a, it is possible to further reduce thermal interference in the L0 layer 20 in which only a low cooling effect is obtained and it is possible to suppress the re-crystallization of the phase change material contained in the L0 layer 20.

The present invention is in no way limited to the aforementioned embodiment, but rather various modifications are possible within the scope of the invention as recited in the claims, and these are naturally included within the scope of the invention.

For example, in the preferred embodiment above, an optical recording medium having two recording layers was described, but the optical recording media to which the present invention applies are not limited thereto so the present invention is also applicable to optical recording media having three or more recording layers.

In this case, when data are to be recorded in one of information recording layers other than an information recording layer farthest from the light incidence plane 13a, the ratio Pe/Pw can be set to be smaller than that when data are to be recorded in the information recording layer farthest from the light incidence plane 13a, for example, about 0.38 to 0.66 times the latter, and it is preferable to set the ratio Pe/Pw to decrease stepwise as the information recording layer in which data are to be recorded is closer to the light incidence plane 13a. Further, when data are to be recorded in one of information recording layers other than an information recording layer farthest from the light incidence plane 13a, the pulse width $T_{top}$ (and the pulse width $T_{lp}$) can be set to be shorter than the pulse width $T_{top}$ when data are to be recorded in the information recording layer farthest from the light incidence plane 13a, for example, about 0.40 to 0.75 times the latter. Furthermore, when data are to be recorded in one of information recording layers other than an information recording layer farthest from the light incidence plane 13a, the pulse width $T_{mp}$ can be set to be shorter than that when data are to be recorded in the information recording layer farthest from the light incidence plane 13a, for example, about 0.48 to 0.58 times the latter. Moreover, when data are to be recorded in one of information recording layers other than an information recording layer farthest from the light incidence plane 13a, the cooling interval $T_{cl}$ can be set to be longer than that when data are to be recorded in the information recording layer farthest from the light incidence plane 13a, for example, about 1.25 to 2.00 times the latter. It is preferable to set the pulse width $T_{top}$ (and the pulse width $T_{lp}$) and the pulse width $T_{mp}$ to decrease stepwise and set the cooling interval $T_{cl}$ to increase stepwise, as the information recording layer in which data are to be recorded is closer to the light incidence plane 13a.

As described above, according to the present invention, recording marks having good shapes can be formed even when information in any one of the information recording layers is directly overwritten.

Here, the influence of thermal interference becomes pronounced as the wavelength of the laser beam used for recording data is shorter and the numerical aperture (NA) of the objective lens used for converging the laser beam is larger. Therefore, the present invention is particularly effective in the case where the quotient (λ/NA) of the wavelength λ of the laser beam used for reproducing data divided by the numerical aperture (NA) of the objective lens used to focus the laser beam is equal to or shorter than 700 nm, for example, where the numerical aperture NA is 0.7 (particularly, roughly 0.85) and the wavelength λ of the laser beam is about 200 to 450 nm.

WORKING EXAMPLE

Hereinafter, a Working Example will be described concretely.

Fabrication of an Optical Recording Medium 10

A stamper 40 shown in FIG. 2 was first used to perform injection molding of polycarbonate, thereby fabricating a substrate 11 having grooves 11a whose depth was 34 mm and whose pitch was 0.32 μm and a thickness of 1.1 mm.

Then, the substrate 11 was set in a sputtering apparatus (not shown) and an Ag alloy, a mixture of ZnS and $SiO_2$ (mole ratio of 80:20), AgSbTeGe and a mixture of ZnS and $SiO_2$ (mole ratio of 80:20) were sputtered in this order on nearly the entire surface of the side of the substrate 11 on which the grooves 11a and the lands 11b were formed, thereby forming an L1 layer 30, namely, a reflective film 34 having a thickness of 100 nm, a fourth dielectric film 33 having a thickness of 15 nm, an L1 recording film 32 having a thickness of 12 nm and a third dielectric film 31 having a thickness of 80 nm.

Next, the substrate 11 formed with the L1 layer was picked out from the sputtering apparatus and an ultraviolet ray curable resin was applied onto the third dielectric film 31 using a spin coating process. Further, an ultraviolet ray was shined on the surface of the spin-coated ultraviolet ray curable resin through a stamper 41 in the state with its surface covered with the stamper 41, thereby forming an intermediate layer 12 having grooves 12a whose depth was 34 mm and whose pitch was 0.32 μm and a thickness of 20 μm.

Then, the substrate 11 formed with the L1 layer 30 and the intermediate layer 12 was set in the sputtering apparatus and $Al_2O_3$, SbTe and a mixture of ZnS and $SiO_2$ (mole ratio of 80:20) were sputtered in this order on nearly the entire surface of the side of the intermediate layer 12 on which the grooves 12a and the lands 12b are formed, thereby forming an L0 layer 20, namely, a second dielectric film 23 having a thickness of 70 nm, an L0 recording film 22 having a thickness of 8 nm and a first dielectric film 21 having a thickness of 60 nm.

Further, after the substrate 11 formed with the L1 layer 30, the intermediate layer 12 and the L0 layer 20 was picked out from the sputtering apparatus, an ultraviolet ray curable resin was applied onto the first dielectric film 21 using a spin coating process and an ultraviolet ray was shined on the spin-coated ultraviolet ray curable resin, thereby forming a light transmission layer 13 having a thickness of 100 μm. Thus, an optical recording medium precursor was fabricated.

Next, the optical recording medium precursor was placed upon the rotary table of a laser irradiation apparatus (not shown) and rotated while being continuously irradiated with a rectangular laser beam having a shorter length in the direction along the track and a longer length in the direction perpendicular to the track. The irradiation position was shifted in the direction perpendicular to the track each time the optical recording medium precursor made one revolution, thereby crystallizing substantially the entire surface of the L0 recording film 22 and the L1 recording film 32. Thus, an optical recording medium 10 to be used in this Working Example was completed.

Setting the Power of a Laser Beam

Data were recorded in the L0 layer 20 and the L1 layer 30 of the thus fabricated optical recording medium 10 while the recording power (Pw) and the erasing power (Pe) are varied and jitter of the thus formed recording marks were measured. The jitter was calculated based on a formula: σ/Tw (%) where Tw was one clock period by measuring clock jitter using a time interval analyzer and obtaining the fluctuation σ the reproduced signal. Random signals in the (1,7) RLL modulation scheme were recorded as data by setting a clock frequency to 65.7 MHz (T=15.2 nsec) and a linear recording velocity to 5.7 m/sec. The wavelength of the laser beam used for recording data was 405 nm and the numerical aperture of an objective lens used for converging the laser beam was 0.85.

Further, in the case of recording data in the L0 recording film 22, $T_{top0}$, $T_{mp0}$, $T_{lp0}$ and $T_{cl0}$ were set to 0.2T, 0.2T, 0.2T and 1.0T, respectively, and in the case of recording data in the L1 recording film 32, $T_{top1}$, $T_{mp1}$, $T_{lp1}$ and $T_{cl1}$ were set to 0.4T, 0.4T, 0.5T and 0.8T, respectively.

The results of measurement of jitter of signals reproduced from the L0 layer 20 are shown in Table 1.

TABLE 1

| Pw0 (mW) | Pe0 (mW) | Pe0/Pw0 | jitter (%) |
|---|---|---|---|
| 5.5 | 1.8 | 0.327 | 16.8 |
| 5.5 | 1.5 | 0.273 | 13.1 |
| 5.5 | 1.3 | 0.236 | 12.4 |
| 5.5 | 1.0 | 0.182 | 14.1 |
| 5.5 | 0.8 | 0.145 | 17.0 |
| 5.0 | 2.0 | 0.400 | 17.7 |
| 5.0 | 1.8 | 0.360 | 14.0 |
| 5.0 | 1.5 | 0.300 | 11.7 |
| 5.0 | 1.3 | 0.260 | 11.1 |
| 5.0 | 1.0 | 0.200 | 11.9 |
| 5.0 | 0.8 | 0.160 | 12.3 |
| 5.0 | 0.5 | 0.100 | 14.7 |
| 4.5 | 2.0 | 0.444 | 18.3 |
| 4.5 | 1.8 | 0.400 | 14.9 |
| 4.5 | 1.5 | 0.333 | 11.4 |
| 4.5 | 1.3 | 0.289 | 11.7 |
| 4.5 | 1.0 | 0.222 | 13.1 |
| 4.5 | 0.8 | 0.178 | 15.4 |

As shown in Table 1, in the case of recording data in the L0 recording film 22, good jitter characteristics could be obtained when the recording power (Pw0) was 4.5 to 5.0 mW and the erasing power (Pe0) was 1.3 to 1.5 mW. Here, the values of the recording power (Pw0) and the erasing power (Pe0) were defined as those at the surface of the optical recording medium. The value of the bottom power (Pb0) referred to later was similarly defined. Therefore, it was found that in the case of recording data in the L0 recording film 22, good jitter characteristics could be obtained when the ratio (Pe0/Pw0) of the recording power (Pw0) and the erasing power (Pe0) was about 0.26 to 0.33.

Figure 8:
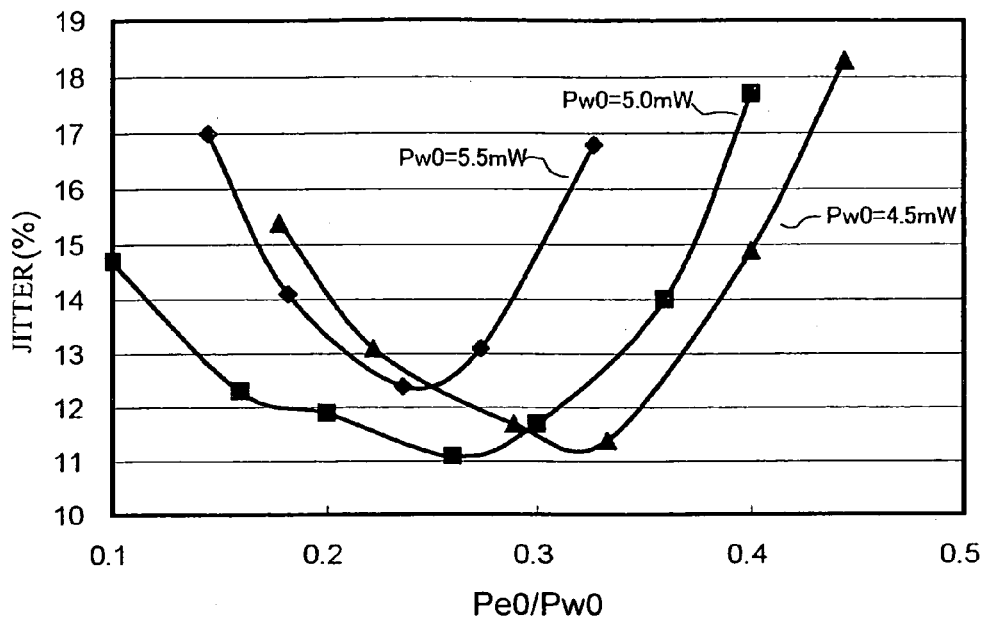
FIG. 8 is a graph showing a relationship between a ratio (Pe0/Pw0) of a recording power (Pw0) and an erasing power (Pe0), and jitter.

FIG. 8 is a graph showing the relationship between the ratio (Pe0/Pw0) of the recording power (Pw0) and the erasing power (Pe0), and jitter. It can be seen from FIG. 8 that good jitter characteristics could be obtained when the ratio (Pe0/Pw0) of the recording power (Pw0) and the erasing power (Pe0) was about 0.26 to 0.33. From FIG. 8 it was confirmed that particularly good jitter characteristics could be obtained when the ratio (Pe0/Pw0) of the recording power (Pw0) and the erasing power (Pe0) was about 0.30.

The results of measurement of jitter of signals reproduced from the L1 layer 30 are shown in Table 2.

TABLE 2

| Pw1 (mW) | Pe1 (mW) | Pe1/Pw1 | jitter (%) |
|---|---|---|---|
| 10.0 | 7.0 | 0.700 | 11.6 |
| 10.0 | 6.5 | 0.650 | 10.1 |
| 10.0 | 6.0 | 0.600 | 9.7 |
| 10.0 | 5.5 | 0.550 | 10.2 |
| 10.0 | 5.0 | 0.500 | 10.8 |
| 10.0 | 4.5 | 0.450 | 11.1 |
| 10.0 | 4.0 | 0.400 | 11.2 |
| 10.0 | 3.8 | 0.380 | 11.6 |
| 10.0 | 3.5 | 0.350 | 12.6 |
| 10.0 | 3.2 | 0.320 | 14.2 |
| 9.5 | 7.0 | 0.737 | 13.9 |
| 9.5 | 6.5 | 0.684 | 11.0 |
| 9.5 | 6.0 | 0.632 | 10.2 |
| 9.5 | 5.5 | 0.579 | 10.1 |
| 9.5 | 5.0 | 0.526 | 10.9 |
| 9.5 | 4.5 | 0.474 | 11.2 |
| 9.5 | 4.0 | 0.421 | 11.6 |
| 9.5 | 3.8 | 0.400 | 12.1 |
| 9.5 | 3.5 | 0.368 | 13.7 |
| 9.5 | 3.2 | 0.337 | 14.9 |

As shown in Table 2, in the case of recording data in the L1 recording film 32, good jitter characteristics could be obtained when the recording power (Pw1) was 9.5 to 10.0 mW and the erasing power (Pe1) was 5.0 to 6.5 mW. Here, the values of the recording power (Pw1) and the erasing power (Pe1) were defined as those at the surface of the optical recording medium. The value of the bottom power (Pb1) referred to later was similarly defined. Therefore, it was found that in the case of recording data in the L1 recording film 32, good jitter characteristics could be obtained when the ratio (Pe1/Pw1) of the recording power (Pw1) and the erasing power (Pe1) was about 0.50 to 0.68.

Figure 9:
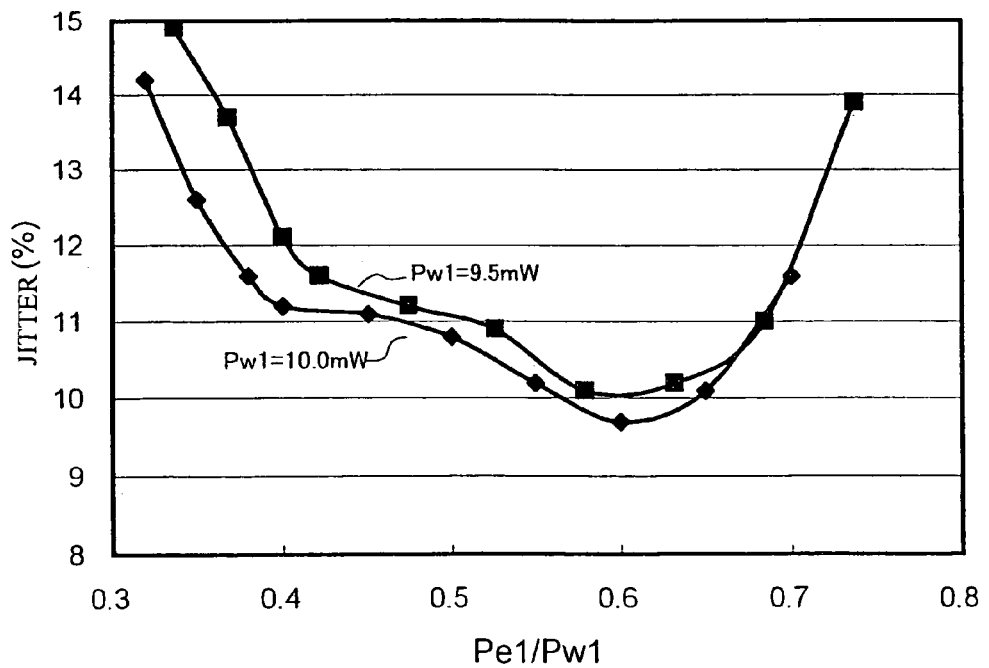
FIG. 9 is a graph showing a relationship between a ratio (Pe1/Pw1) of a recording power (Pw1) and an erasing power (Pe1), and jitter.

FIG. 9 is a graph showing the relationship between the ratio (Pe1/Pw1) of the recording power (Pw1) and the erasing power (Pe1), and jitter. It can be seen from FIG. 9 that good jitter characteristics could be obtained when the ratio (Pe1/Pw1) of the recording power (Pw1) and the erasing power (Pe1) was about 0.50 to 0.68. From FIG. 9 it was confirmed that particularly good jitter characteristics could be obtained when the ratio (Pe1/Pw1) of the recording power (Pw1) and the erasing power (Pe1) was about 0.60.

In view of the above, it was found that it was preferable to set the ratio (Pe0/Pw0) to be about 0.38 to 0.66 times the ratio (Pe1/Pw1), was more preferable to set it to be about 0.44 to 0.55 times the ratio (Pe1/Pw1) and was particularly preferable to set it to be about 0.50 times the ratio (Pe1/Pw1).

Setting Pulse Widths

Then, data were recorded in the L0 layer 20 and the L1 layer 30 of the thus fabricated optical recording medium 10 while the pulse width $T_{top}$ of the top pulse, the pulse width $T_{mp}$ of each of the multi-pulses, the pulse width $T_{lp}$ of the last pulse and the cooling interval $T_{cl}$ were varied and jitter of the thus formed recording marks were measured. In this Working Example, since the pulse width $T_{top}$ of the top pulse and the pulse width $T_{lp}$ of the last pulse were set to be equal to each other, the pulse width $T_{top}$ of the top pulse will also be used to indicate the pulse width $T_{lp}$ of the last pulse below. Similarly to the above operation of setting the power of the laser beam, random signals in the (1,7) RLL modulation scheme were recorded as data by setting a clock frequency to 65.7 MHz (T=15.2 nsec) and a linear recording velocity to 5.7 m/sec. The wavelength of the laser beam used for recording data was 405 nm and the numerical aperture of the objective lens used for converging the laser beam was 0.85.

Further, when data were recorded in the L0 recording film 22, the recording power (Pw0), the erasing power (Pe0) and the bottom power (Pb0) were fixed to 5.0 mW, 1.5 mW and 0.1 mW, respectively, and when data were recorded in the L1 recording film 32, the recording power (Pw1), the erasing power (Pe1) and the bottom power (Pb1) were fixed to 10.0 mW, 6.0 mW and 0.1 mW, respectively.

First, data were recorded with the pulse width $T_{top}$ of the top pulse and the pulse width $T_{mp}$ of each of the multi-pulses set to be equal to each other and varying the widths thereof while fixing the cooling interval $T_{cl}$, and jitter of the thus formed recording marks were measured.

The results of measurement of jitter of signals reproduced from the L0 recording film 22 are shown in Table 3 and results of measurement of jitter of signals reproduced from the L1 recording film 32 were shown in Table 4.

TABLE 3

| $T_{top0}$ | $T_{mp0}$ | $T_{cl0}$ | jitter(%) |
|---|---|---|---|
| 0.16T | 0.16T | 1.0T | 17.1 |
| 0.18T | 0.18T | 1.0T | 12.6 |
| 0.20T | 0.20T | 1.0T | 10.9 |
| 0.22T | 0.22T | 1.0T | 11.9 |
| 0.24T | 0.24T | 1.0T | 13.5 |
| 0.26T | 0.26T | 1.0T | 15.3 |

TABLE 4

| $T_{top1}$ | $T_{mp1}$ | $T_{cl1}$ | jitter(%) |
|---|---|---|---|
| 0.30T | 0.30T | 0.8T | 14.1 |
| 0.35T | 0.35T | 0.8T | 12.3 |
| 0.38T | 0.38T | 0.8T | 11.8 |
| 0.40T | 0.40T | 0.8T | 10.9 |
| 0.42 | 0.42 | 0.8T | 11.6 |
| 0.45T | 0.45T | 0.8T | 12.7 |
| 0.50T | 0.50T | 0.8T | 14.4 |

As shown in Table 3, in the case of recording data in the L0 recording film 22, good jitter characteristics could be obtained when the pulse width $T_{top0}$ of the top pulse and the pulse width $T_{mp0}$ of each of the multi-pulses were 0.20T. Further, as shown in Table 4, in the case of recording data in the L1 recording film 32, good jitter characteristics could be obtained when the pulse width $T_{top1}$ of the top pulse and the pulse width $T_{mp1}$ of each of the multi-pulses were 0.40T.

Then, data were recorded by fixing one of the pulse width $T_{top}$ of the top pulse and the pulse width $T_{mp}$ of each of the multi-pulses to the thus obtained pulse width, namely, 0.20T in the case of recording data in the L0 recording film 22 or 0.40T in the case of recording data in the L1 recording film 32 and varying the other, and jitter of the thus formed recording marks were measured.

The results of measurement of jitter of signals reproduced from the L0 recording film 22 are shown in Table 5 and results of measurement of jitter of signals reproduced from the L1 recording film 32 are shown in Table 6.

TABLE 5

| $T_{top0}$ | $T_{mp0}$ | $T_{cl0}$ | jitter(%) |
|---|---|---|---|
| 0.20T | 0.18T | 1.0T | 12.2 |
| 0.20T | 0.20T | 1.0T | 10.9 |
| 0.20T | 0.22T | 1.0T | 11.7 |
| 0.20T | 0.24T | 1.0T | 13.1 |

TABLE 5-continued

| $T_{top0}$ | $T_{mp0}$ | $T_{cl0}$ | jitter(%) |
|---|---|---|---|
| 0.20T | 0.26T | 1.0T | 13.4 |
| 0.18T | 0.20T | 1.0T | 11.6 |
| 0.22T | 0.20T | 1.0T | 10.6 |
| 0.24T | 0.20T | 1.0T | 10.9 |
| 0.26T | 0.20T | 1.0T | 11.2 |
| 0.30T | 0.20T | 1.0T | 11.5 |
| 0.35T | 0.20T | 1.0T | 11.9 |
| 0.40T | 0.20T | 1.0T | 12.4 |

TABLE 6

| $T_{top1}$ | $T_{mp1}$ | $T_{cl1}$ | jitter(%) |
|---|---|---|---|
| 0.40T | 0.35T | 0.8T | 12.1 |
| 0.40T | 0.38T | 0.8T | 11.1 |
| 0.40T | 0.40T | 0.8T | 10.9 |
| 0.40T | 0.42T | 0.8T | 11.4 |
| 0.40T | 0.45T | 0.8T | 12.3 |
| 0.35T | 0.40T | 0.8T | 11.7 |
| 0.38T | 0.40T | 0.8T | 11.6 |
| 0.42T | 0.40T | 0.8T | 11.1 |
| 0.45T | 0.40T | 0.8T | 11.4 |

As shown in Table 5, in the case of recording data in the L0 recording film 22, if the pulse width $T_{top0}$ of the top pulse was fixed to 0.20T, good jitter characteristics could be obtained when the pulse width $T_{mp0}$ of each of the multi-pulses was 0.20T to 0.22T and best jitter characteristics could be obtained when the pulse width $T_{mp0}$ of each of the multi-pulses was 0.20T. On the other hand, if the pulse width $T_{mp0}$ of each of the multi-pulses was fixed to 0.20T, good jitter characteristics could be obtained when the pulse width $T_{top0}$ of the top pulse was 0.18T to 0.30T and best jitter characteristics could be obtained when the pulse width $T_{top0}$ of the top pulse was 0.22T. Further, as shown in Table 6, in the case of recording data in the L1 recording film 32, if the pulse width $T_{top1}$ of the top pulse was fixed to 0.40T, good jitter characteristics could be obtained when the pulse width $T_{mp1}$ of each of the multi-pulses was 0.38T to 0.42T and best jitter characteristics could be obtained when the pulse width $T_{mp1}$ of each of the multi-pulses was 0.40T. On the other hand, if the pulse width $T_{mp1}$ of each of the multi-pulses was fixed to 0.40T, good jitter characteristics could be obtained when the pulse width $T_{top1}$ of the top pulse was 0.40T to 0.45T and best jitter characteristics could be obtained when the pulse width $T_{top1}$ of the top pulse was 0.40T.

Then, data were recorded by fixing the pulse width $T_{top}$ of the top pulse and the pulse width $T_{mp}$ of each of the multi-pulses to the thus obtained pulse width, namely, 0.20T in the case of recording data in the L0 recording film 22 or 0.40T in the case of recording data in the L1 recording film 32 and varying the cooling interval $T_{cl}$, and jitter of the thus formed recording marks were measured.

The results of measurement of jitter of signals reproduced from the L0 recording film 22 are shown in Table 7 and results of measurement of jitter of signals reproduced from the L1 recording film 32 are shown in Table 8.

TABLE 7

| $T_{top0}$ | $T_{mp0}$ | $T_{cl0}$ | jitter(%) |
|---|---|---|---|
| 0.22T | 0.20T | 0.8T | 12.3 |
| 0.22T | 0.20T | 1.0T | 10.6 |
| 0.22T | 0.20T | 1.2T | 11.3 |
| 0.22T | 0.20T | 1.5T | 13.3 |

TABLE 8

| $T_{top1}$ | $T_{mp1}$ | $T_{cl1}$ | jitter(%) |
|---|---|---|---|
| 0.40T | 0.40T | 0.4T | 13.2 |
| 0.40T | 0.40T | 0.6T | 11.7 |
| 0.40T | 0.40T | 0.8T | 10.9 |
| 0.40T | 0.40T | 1.0T | 12.4 |
| 0.40T | 0.40T | 1.2T | 13.1 |
| 0.40T | 0.40T | 1.4T | 14.3 |
| 0.40T | 0.40T | 1.6T | 16.4 |

As shown in Table 7, in the case of recording data in the L0 recording film 22, good jitter characteristics could be obtained when the cooling interval $T_{cl0}$ was 1.0T to 1.2T and best jitter characteristics could be obtained when the cooling interval $T_{cl0}$ was 1.0T. On the other hand, as shown in Table 8, in the case of recording data in the L1 recording film 32, good jitter characteristics could be obtained when the cooling interval $T_{cl1}$ was 0.6T to 0.8T and best jitter characteristics could be obtained when the cooling interval $T_{cl1}$ was 0.8T.

In view of the above, it was found that in the case of recording data in the L0 recording film 22, good jitter characteristics could be obtained by setting the pulse width $T_{top0}$ of the top pulse (=$T_{lp0}$) to 0.18T to 0.30T, particularly to 0.22T, the pulse width $T_{mp0}$ of each of the multi-pulses to 0.20T to 0.22T, particularly to 0.20T, and the cooling interval $T_{cl0}$ to 1.0T to 1.2T, particularly to 1.0T. On the other hand, it was found that in the case of recording data in the L1 recording film 32, good jitter characteristics could be obtained by setting the pulse width $T_{top1}$ of the top pulse (=$T_{lp1}$) to 0.40T to 0.45T, particularly to 0.40T, the pulse width $T_{mp1}$ of each of the multi-pulses to 0.38T to 0.42T, particularly to 0.40T, and the cooling interval $T_{cl1}$ to 0.6T to 0.8T, particularly to 0.8T.

As described above, it was found that it was preferable to set the pulse width $T_{top0}$ (and $T_{lp0}$) to be about 0.40 to 0.75 times the pulse width $T_{top1}$ (and $T_{lp1}$), was more preferable to set it to be about 0.49 to 0.55 times the pulse width $T_{top1}$ (and $T_{lp1}$) and was particularly preferable to set it to be about times the pulse width $T_{top1}$ (and $T_{lp1}$). Further, it was found that it was preferable to set the pulse width $T_{mp0}$ to be about 0.48 to 0.58 times the pulse width $T_{mp1}$, was more preferable to set it to about 0.50 to 0.53 times the pulse width $T_{mp1}$ and was particularly preferable to set it to be about 0.50 time the pulse width $T_{mp1}$. Moreover, it was found that it was preferable to set the cooling interval $T_{cl0}$ to be about 1.25 to 2.00 times the cooling interval $T_{cl1}$, was more preferable to set it to be about 1.25 to 1.50 times the cooling interval $T_{cl1}$ and was particularly preferable to set it to be about 1.25 times the cooling interval $T_{cl1}$.

The invention claimed is:

1. An information recording method for recording information in an optical recording medium having at least stacked first and second information recording layers by projecting a laser beam whose power is modulated thereonto via a light incidence plane, the information recording method comprising steps of setting λ/NA to be equal to or shorter than 700 nm, where λ is a wavelength of the laser beam and NA is a numerical aperture of an objective lens for converging the laser beam, and setting a pulse width of a top pulse of the laser beam when information is to be recorded in the first information recording layer to be shorter than that when information is to be recorded in the second information recording layer, thereby recording information in the optical recording medium.

2. An information recording method in accordance with claim 1, which further comprises a step of setting a pulse width of a multi-pulse of the laser beam when information is to be recorded in the first information recording layer to be shorter than that when information is to be recorded in the second information recording layer, thereby recording information in the optical recording medium.

3. An information recording method in accordance with claim 1, which further comprises a step of a cooling interval by the laser beam when information is to be recorded in the first information recording layer to be longer than that when information is to be recorded in the second information recording layer, thereby recording information in the optical recording medium.

4. An information recording method in accordance with claim 1, wherein the first information recording layer is located on the side of the light incidence plane with respect to the second information recording layer.

5. An information recording method in accordance with claim 1, wherein the laser beam has a wavelength $\lambda$ of 200 to 450 nm.

6. An information recording method for recording information in an optical recording medium having at least stacked first and second information recording layers by projecting a laser beam whose power is modulated thereonto via a light incidence plane, the information recording method comprising steps of setting $\lambda/NA$ to be equal to or shorter than 700 nm, where $\lambda$ is a wavelength of the laser beam and NA is a numerical aperture of an objective lens for converging the laser beam, and setting a pulse width of a multi-pulse of the laser beam when information is to be recorded in the first information recording layer to be shorter than that when information is to be recorded in the second information recording layer, thereby recording information in the optical recording medium.

7. An information recording method in accordance with claim 6, which further comprises a step of setting a cooling interval by the laser beam when information is to be recorded in the first information recording layer to be longer than that when information is to be recorded in the second information recording layer, thereby recording information in the optical recording medium.

8. An information recording method in accordance with claim 6, wherein the first information recording layer is located on the side of the light incidence plane with respect to the second information recording layer.

9. An information recording method in accordance with claim 6, wherein the laser beam has a wavelength $\lambda$ of 200 to 450 nm.

10. An information recording method for recording information in an optical recording medium having at least stacked first and second information recording layers by projecting a laser beam whose power is modulated thereonto via a light incidence plane, the information recording method comprising steps of setting $\lambda/NA$ to be equal to or shorter than 700 nm, where $\lambda$ is a wavelength of the laser beam and NA is a numerical aperture of an objective lens for converging the laser beam, and setting a cooling interval by the laser beam when information is to be recorded in the first information recording layer to be longer than that when information is to be recorded in the second information recording layer, thereby recording information in the optical recording medium.

11. An information recording method in accordance with claim 10, wherein the first information recording layer is located on the side of the light incidence plane with respect to the second information recording layer.

12. An information recording method in accordance with claim 10, wherein the laser beam has a wavelength $\lambda$ of 200 to 450 nm.

13. An information recording method for recording information in an optical recording medium having at least stacked first and second information recording layers by projecting a laser beam whose power is modulated thereonto via a light incidence plane, the information recording method comprising steps of setting a pulse width of a top pulse of the laser beam when information is to be recorded in the first information recording layer to be 0.40 to 0.75 times that when information is to be recorded in the second information recording layer, thereby recording information in the optical recording medium.

14. An information recording method in accordance with claim 13, which further comprises a step of setting a pulse width of a multi-pulse of the laser beam when information is to be recorded in the first information recording layer to be 0.48 to 0.58 times that when information is to be recorded in the second information recording layer, thereby recording information in the optical recording medium.

15. An information recording method in accordance with claim 13, which further comprises a step of setting a cooling interval by the laser beam when information is to be recorded in the first information recording layer to be 1.25 to 2.00 times that when information is to be recorded in the second information recording layer, thereby recording information in the optical recording medium.

16. An information recording method in accordance with claim 13, wherein the first information recording layer is located on the side of the light incidence plane with respect to the second information recording layer.

17. An information recording method in accordance with claim 13, wherein a wavelength $\lambda$ of the laser beam and a numerical aperture NA of an objective lens satisfy the condition that $\lambda/NA$ is equal to or shorter than 700 nm.

18. An information recording method in accordance with claim 13, wherein the laser beam has a wavelength $\lambda$ of 200 to 450 nm.

19. An information recording method for recording information in an optical recording medium having at least stacked first and second information recording layers by projecting a laser beam whose power is modulated thereonto via a light incidence plane, the information recording method comprising steps of setting a pulse width of a multi-pulse of the laser beam when information is to be recorded in the first information recording layer to be 0.48 to 0.58 times that when information is to be recorded in the second information recording layer, thereby recording information in the optical recording medium.

20. An information recording method in accordance with claim 19, which further comprises a step of setting a cooling interval by the laser beam when information is to be recorded in the first information recording layer to be 1.25 to 2.00 times that when information is to be recorded in the second information recording layer, thereby recording information in the optical recording medium.

21. An information recording method in accordance with claim 19, wherein the first information recording layer is located on the side of the light incidence plane with respect to the second information recording layer.

22. An information recording method in accordance with claim 19, wherein a wavelength $\lambda$ of the laser beam and a numerical aperture NA of an objective lens satisfy the condition that $\lambda/NA$ is equal to or shorter than 700 nm.

23. An information recording method in accordance with claim 19, wherein the laser beam has a wavelength λ of 200 to 450 nm.

24. An information recording method for recording information in an optical recording medium having at least stacked first and second information recording layers by projecting a laser beam whose power is modulated thereonto via a light incidence plane, the information recording method comprising steps of setting a cooling interval by the laser beam when information is to be recorded in the first information recording layer to be 1.25 to 2.00 times that when information is to be recorded in the second information recording layer, thereby recording information in the optical recording medium.

25. An information recording method in accordance with claim 24, wherein the first information recording layer is located on the side of the light incidence plane with respect to the second information recording layer.

26. An information recording method in accordance with claim 24, wherein a wavelength λ of the laser beam and a numerical aperture NA of an objective lens satisfy the condition that λ/NA is equal to or shorter than 700 nm.

27. An information recording method in accordance with claim 24, wherein the laser beam has a wavelength λ of 200 to 450 nm.

28. An information recording apparatus for recording information in an optical recording medium having at least stacked first and second information recording layers by projecting a laser beam whose power is modulated thereonto via a light incidence plane, the information recording apparatus being constituted so as to set λ/NA to be equal to or shorter than 700 nm, where A is a wavelength of the laser beam and NA is a numerical aperture of an objective lens for converging the laser beam, and set a pulse width of a top pulse of the laser beam when information is to be recorded in the first information recording layer to be shorter than that when information is to be recorded in the second information recording layer, thereby recording information in the optical recording medium.

29. An information recording apparatus in accordance with claim 28, wherein the pulse width of the top pulse of the laser beam when information is to be recorded in the first information recording layer is set to be 0.40 to 0.75 times that when information is to be recorded in the second information recording layer, thereby recording information in the optical recording medium.

30. An information recording apparatus in accordance with claim 28, wherein the first information recording layer is located on the side of the light incidence plane with respect to the second information recording layer.

31. An information recording apparatus in accordance with claim 28, wherein the laser beam has a wavelength λ of 200 to 450 nm.

32. An information recording apparatus for recording information in an optical recording medium having at least stacked first and second information recording layers by projecting a laser beam whose power is modulated thereonto via a light incidence plane, the information recording apparatus being constituted so as to set λ/NA to be equal to or shorter than 700 nm, where λ is a wavelength of the laser beam and NA is a numerical aperture of an objective lens for converging the laser beam, and set a pulse width of a multi-pulse of the laser beam when information is to be recorded in the first information recording layer to be shorter than that when information is to be recorded in the second information recording layer, thereby recording information in the optical recording medium.

33. An information recording apparatus in accordance with claim 32, wherein the pulse width of the multi-pulse of the laser beam when information is to be recorded in the first information recording layer is set to be 0.48 to 0.58 times that when information is to be recorded in the second information recording layer, thereby recording information in the optical recording medium.

34. An information recording apparatus in accordance with claim 32, wherein the first information recording layer is located on the side of the light incidence plane with respect to the second information recording layer.

35. An information recording apparatus in accordance with claim 32, wherein the laser beam has a wavelength λ of 200 to 450 nm.

36. An information recording apparatus for recording information in an optical recording medium having at least stacked first and second information recording layers by projecting a laser beam whose power is modulated thereonto via a light incidence plane, the information recording apparatus being constituted so as to set λ/NA to be equal to or shorter than 700 nm, where λ is a wavelength of the laser beam and NA is a numerical aperture of an objective lens for converging the laser beam, and set a cooling interval by the laser beam when information is to be recorded in the first information recording layer to be longer than that when information is to be recorded in the second information recording layer, thereby recording information in the optical recording medium.

37. An information recording apparatus in accordance with claim 36, wherein the cooling interval by the laser beam when information is to be recorded in the first information recording layer to be 1.25 to 2.00 times that when information is to be recorded in the second information recording layer, thereby recording information in the optical recording medium.

38. An information recording apparatus in accordance with claim 36, wherein the first information recording layer is located on the side of the light incidence plane with respect to the second information recording layer.

39. An information recording apparatus in accordance with claim 36, wherein the laser beam has a wavelength λ of 200 to 450 nm.

40. An optical recording medium which has at least stacked first and second information recording layers and in which information can be recorded by projecting a laser beam whose power is modulated thereonto via a light incidence plane, the optical recording medium comprising setting information required for setting λ/NA to be equal to or shorter than 700 nm, where λ is a wavelength of the laser beam and NA is a numerical aperture of an objective lens for converging the laser beam, and setting a pulse width of a top pulse of the laser beam when information is to be recorded in the first information recording layer to be shorter than that when information is to be recorded in the second information recording layer, thereby recording information in the optical recording medium.

41. An optical recording medium in accordance with claim 40, wherein the setting information includes setting information required for setting the pulse width of the top pulse of the laser beam when information is to be recorded in the first information recording layer to be 0.40 to 0.75 times that when information is to be recorded in the second information recording layer, thereby recording information in the optical recording medium.

42. An optical recording medium in accordance with claim 40, which further comprises a light transmission layer and the light transmission layer has a thickness of 30 to 200 μm.

43. An optical recording medium which has at least stacked first and second information recording layers and in which information can be recorded by projecting a laser beam whose power is modulated thereonto via a light incidence plane, the optical recording medium comprising setting information required for setting λ/NA to be equal to or shorter than 700 nm, where λ is a wavelength of the laser beam and NA is a numerical aperture of an objective lens for converging the laser beam, and setting a pulse width of a multi-pulse of the laser beam when information is to be recorded in the first information recording layer to be shorter than that when information is to be recorded in the second information recording layer, thereby recording information in the optical recording medium.

44. An optical recording medium in accordance with claim 43, wherein the setting information includes setting information required for setting the pulse width of the multi-pulse of the laser beam when information is to be recorded in the first information recording layer to be 0.48 to 0.58 times that when information is to be recorded in the second information recording layer, thereby recording information in the optical recording medium.

45. An optical recording medium in accordance with claim 43, which further comprises a light transmission layer and the light transmission layer has a thickness of 30 to 200 μm.

46. An optical recording medium which has at least stacked first and second information recording layers and in which information can be recorded by projecting a laser beam whose power is modulated thereonto via a light incidence plane, the optical recording medium comprising setting information required for setting λ/NA to be equal to or shorter than 700 nm, where λ is a wavelength of the laser beam and NA is a numerical aperture of an objective lens for converging the laser beam, and setting a cooling interval by the laser beam when information is to be recorded in the first information recording layer to be shorter than that when information is to be recorded in the second information recording layer, thereby recording information in the optical recording medium.

47. An optical recording medium in accordance with claim 46, wherein the setting information includes setting information required for setting the cooling interval by the laser beam when information is to be recorded in the first information recording layer to be 1.25 to 2.00 times that when information is to be recorded in the second information recording layer, thereby recording information in the optical recording medium.

48. An optical recording medium in accordance with claim 46, which further comprises a light transmission layer and the light transmission layer has a thickness of 30 to 200 μm.

* * * * *

UNITED STATES PATENT AND TRADEMARK OFFICE
CERTIFICATE OF CORRECTION

PATENT NO. : 7,298,682 B2  Page 1 of 1
APPLICATION NO. : 10/504441
DATED : November 20, 2007
INVENTOR(S) : Hideaki Miura et al.

It is certified that error appears in the above-identified patent and that said Letters Patent is hereby corrected as shown below:

Column 25

Claim 28, line 32, "shorter than 700 nm, where A is a wavelength of the laser" should read --shorter than 700 nm, where $\lambda$ is a wavelength of the laser--.

Signed and Sealed this

Seventeenth Day of February, 2009

JOHN DOLL
*Acting Director of the United States Patent and Trademark Office*